United States Patent
Li et al.

(10) Patent No.: US 11,782,724 B2
(45) Date of Patent: Oct. 10, 2023

(54) PARALLEL DECISION SYSTEM AND METHOD FOR DISTRIBUTED DATA PROCESSING

(71) Applicant: BEIJING ONEFLOW TECHNOLOGY CO., LTD, Beijing (CN)

(72) Inventors: Yipeng Li, Beijing (CN); Juncheng Liu, Beijing (CN); Xinqi Li, Beijing (CN); Cheng Cheng, Beijing (CN); Jinhui Yuan, Beijing (CN)

(73) Assignee: BEIJING ONEFLOW TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/125,020

(22) Filed: Mar. 22, 2023

(65) Prior Publication Data

US 2023/0229449 A1    Jul. 20, 2023

Related U.S. Application Data

(63) Continuation of application No. PCT/CN2021/103003, filed on Jun. 29, 2021.

(30) Foreign Application Priority Data

Sep. 22, 2020 (CN) .......................... 202010999246.X

(51) Int. Cl.
*G06F 9/38* (2018.01)
*G06F 9/445* (2018.01)

(52) U.S. Cl.
CPC ........ *G06F 9/3885* (2013.01); *G06F 9/44505* (2013.01)

(58) Field of Classification Search
None
See application file for complete search history.

(56) References Cited

U.S. PATENT DOCUMENTS 9,213,574 B2 * 12/2015 Faruquie .................. G06F 9/50
10,547,514 B2 * 1/2020 Rao ..................... H04L 41/046
(Continued)

FOREIGN PATENT DOCUMENTS

| CN | 102799945 A | 11/2012 |
| CN | 104504018 A | 4/2015 |

(Continued)

OTHER PUBLICATIONS

International Search Report of PCT/CN2021/103003.
Written Opinion of PCT/CN2021/103003.

*Primary Examiner* — Eric Coleman

(57) ABSTRACT

The present disclosure provides a parallel decision system and method for distributed data processing. The system includes: an initial logical node generation assembly, a logical node traversal assembly, a predetermined configuration cost computation assembly, and a parallel decision assembly. The initial logical node generation assembly is configured to receive task configuration data input by a user to generate an initial logical node topology for the distributed data processing system. The logical node traversal assembly is configured to traverse the initial logical node topology to obtain a predetermined configuration in the initial logical node topology. The predetermined configuration cost computation assembly is configured to compute a transmission cost of each predetermined configuration and a cost sum. The predetermined configuration transformation assembly is configured to, based on the result of the predetermined configuration, reduce an initial logical node, and a connection edge, a combined initial logical node.

8 Claims, 5 Drawing Sheets

(56) References Cited

U.S. PATENT DOCUMENTS

| | | | | |
|---|---|---|---|---|
| 2015/0268990 A1* | 9/2015 | Greene | ............... | G06F 11/3476 |
| | | | | 718/104 |
| 2015/0269006 A1* | 9/2015 | Caufield | ................ | G06F 11/34 |
| | | | | 718/105 |
| 2020/0142753 A1* | 5/2020 | Harwood | .................. | G06F 9/52 |

FOREIGN PATENT DOCUMENTS

| | | |
|---|---|---|
| CN | 110928697 A | 3/2020 |
| CN | 110955734 B | 8/2020 |
| CN | 111930519 A | 11/2020 |

\* cited by examiner

PARALLEL DECISION SYSTEM AND METHOD FOR DISTRIBUTED DATA PROCESSING

CROSS-REFERENCE TO RELATED APPLICATIONS

This application is a bypass continuation application of PCT application no.: PCT/CN2021/103003. This application claims priorities from PCT Application PCT/CN2021/103003, filed Jun. 29, 2021, and from the Chinese patent application 202010999246.X, filed Sep. 22, 2020, the contents of which is incorporated herein in the entirety by reference.

TECHNICAL FIELD

The present disclosure relates to the field of data processing technologies, and in particular to a parallel decision system and method for distributed data processing.

BACKGROUND

In the current days with the popularization of deep learning, more and more models and data with increasing scales result in an inability to implement training of deep learning in a single computation device. For this reason, distributed computation is proposed. Along with the popularization of distributed computation, a large job or large tensor may deploy, through a split, data of different parts to different computing devices of different distributed data processing systems for processing, and need to interact with intermediate parameters in the computation process of each part. Thus, in a processing procedure of a specific job, a computational intermediate parameter or result deployed on one computing device may be referred to as input data of a computation task on another computing device, which may lead to data transmission overhead between the computing devices. In the case of large job data, the transmission overhead between different computing devices will bring an extremely large computational burden to the distributed data processing system. Therefore, in a distributed data processing system supporting data parallel, model parallel, hybrid parallel, and streaming parallel, how to reduce the data transmission overhead between different computing devices is a problem that people have to face.

Therefore, people attempt to obtain a data processing mode on whether to use parallel on all distributed computation resources of their own. This mode, on one hand, can satisfy the computing power limitation of the distributed computation resources, and on the other hand, implement data parallel processing as possible so as to improve the data processing capability. Obviously, in the distributed data processing system, when it is determined to perform parallel computation on several computing devices, the parallel mode is not unique. Generally, each logical node may have a different parallel processing mode for the implementation of the same computation task. Different parallel processing modes may bring different running times on each logical node. Thus, when a previous logical node and a next logical node use different parallel processing modes, different data transmission amounts may occur, resulting in different transmission times. Therefore, this also brings different impacts on the data processing time of the entire task, thus leading to different computation efficiencies. The parallel decisions of thousands of or even several million data processing nodes for performing deep learning by manual repeated adjustments will surely result in a large amount of labor waste. Because the people performing manual adjustments are high-rank talents, if these people waste time in trivial jobs such as manual adjustments, talent waste will be surely brought about. Different tasks require different parallel decisions, and even the same set of distributed data processing resources also requires different parallel decisions to maximize data processing efficiency, such that each task needs to be re-adjusted. In the manual adjustment of the parallel decision, the workload of the technicians will be increased and thus human power of the technicians is consumed; on the other hand, when different parallel modes are applied and implemented in different logical nodes, people need to consider memory limitation and consumption of running time, which may not necessarily bring ideal parallel effect (the total running time is compressed to extreme or approximate extreme).

Therefore, people need a method and a system for automatically performing parallel decisions based on distributed data processing resources, so as to determine a parallel mode of each logical node.

SUMMARY

One object of the present disclosure is to address at least the above problems. Specifically, the present disclosure provides a parallel decision system for distributed data processing, including: an initial logical node generation assembly, configured to receive task configuration data input by a user to generate an initial logical node topology for the distributed data processing system, wherein each initial logical node is attached with a candidate parallel solution set based on the task configuration data, each candidate parallel solution specifies a initial logical node parallel solution to which the candidate parallel solution belongs and a candidate computation cost label based on the parallel solution, each connection edge between mutually-connected initial logical nodes is attached with a label of a candidate transmission cost, and the candidate transmission cost is determined by the respective parallel solutions of mutually-connected initial logical nodes; a logical node traversal assembly, configured to traverse the initial logical node topology to obtain a predetermined configuration in the initial logical node topology, wherein the predetermined configuration comprises a first predetermined configuration and/or a second predetermined configuration, the first predetermined configuration is an intermediate initial logical node with a first connection edge and a second connection edge, and the second predetermined configuration is paired initial logical nodes with multiple third connection edges therebetween; and, a predetermined configuration cost computation assembly, configured to, for the first determined configuration, in a case of determining a candidate parallel solution of a first initial logical node of the first connection edge and a candidate parallel solution of a second initial logical node of the second connection edge, obtain each candidate computation cost of the intermediate initial logical node, a first connection edge candidate transmission cost and a second connection edge candidate transmission cost corresponding to the obtained candidate computation cost and a first cost sum of the above three in a case of obtaining each candidate computation cost of each intermediate initial logical node, select a minimum first cost sum as a first candidate transmission cost between the first initial logical node and the second initial logical node in the first predetermined configuration in a case of determining the candidate parallel solution of the first initial logical node of each pair and the candidate parallel solution of the second initial logical node; and for the second predetermined configuration, in a case of determining the candidate parallel solution of a third initial logical node of the paired initial logical nodes and the candidate parallel solution of a fourth initial logical node of the paired initial logical nodes, perform summing for the candidate transmission costs of all connection edges between the paired initial logical nodes to obtain a second cost sum of the candidate transmission costs between the paired initial logical nodes as a second candidate transmission cost; a predetermined configuration transformation assembly, configured to transform the first connection edge, the second connection edge and the intermediate initial logical node of the first predetermined configuration into a first combined connection edge between the first initial logical node of the first connection edge and the second initial logical node of the second connection edge, and assign all first candidate transmission costs obtained for the first predetermined configuration to the first combined connection edge as one of the candidate transmission costs of the first combined connection edge, and transform all connection edges of the second predetermined configuration into a second combined connection edge of the paired initial logical nodes, and assign the second candidate transmission cost obtained for the second predetermined configuration to the second combined connection edge of the paired initial logical nodes as one of the candidate transmission costs of the second combined connection edge; and, a parallel decision assembly, configured to, for a transformation result logical node topology and each sub-topology obtained by performing transformation by using the predetermined configuration transformation assembly, repeatedly traverse each final logical node or each final connection edge therein many times; by a local greedy strategy, obtain a minimum cost sum of the transformation result logical node topology or each sub-topology; and based on an obtained total minimum cost of the transformation result logical node topology, obtain a parallel solution corresponding to the transformation result logical node topology.

In the parallel decision system for distributed data processing according to the present disclosure, the predetermined configuration further comprises a third predetermined configuration, which is an end initial logical node with only a fourth connection edge, wherein the predetermined configuration cost computation assembly is configured to, for the third predetermined configuration, in a case of determining a candidate parallel solution of a dependent initial logical node to which the fourth connection edge of the third predetermined configuration is attached at the end initial logical node, obtain each candidate computation cost of the end initial logical node and a fourth connection edge candidate transmission cost corresponding to the candidate computation cost of the end initial logical node; obtain a third cost sum of the above two in a case of determining the candidate parallel solution of the dependent initial logical node; select a minimum third cost sum as a third additional computation cost in a case of determining the candidate parallel solution of the dependent initial logical node; and, the predetermined configuration transformation assembly clips off the fourth connection edge and the end initial logical node of the third predetermined configuration and adds the third additional computation cost to the computation cost of the dependent initial logical node.

In the parallel decision system for distributed data processing according to the present disclosure, the predetermined configuration further comprises a fourth predetermined configuration, which comprises a fifth initial logical node and a sixth initial logical node which have no connection edge therebetween in a same connected component, and at least one seventh initial logical node connected to the fifth initial logical node and the sixth initial logical node, wherein the predetermined configuration cost computation assembly is configured to, for the fourth predetermined configuration, in a case of determining the candidate parallel solutions of the fifth initial logical node and the sixth initial logical node, obtain the candidate computation costs of the fifth initial logical node and the sixth initial logical node and take a sum of the two candidate computation costs as a fourth cost sum; and in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; and, the predetermined configuration transformation assembly is configured to combine the fifth initial logical node and the sixth initial logical node of the fourth predetermined configuration into a first combined logical node, and combine the fifth connection edge and the sixth connection edge into a third combined connection edge, and assign the fourth cost sum obtained for the fourth predetermined configuration to the first combined logical node as one of the candidate computation costs and assign the third candidate transmission cost to the third combined connection edge as one of the candidate transmission costs.

In the parallel decision system for distributed data processing according to the present disclosure, the predetermined configuration further comprises a fifth predetermined configuration, which comprises a fifth initial logical node and a sixth initial logical node which have a seventh connection edge therebetween in a same connected component, and at least one seventh initial logical node connected to the fifth initial logical node and the sixth initial logical node, wherein the predetermined configuration cost computation assembly is configured to, for the fifth predetermined configuration, in a case of determining the candidate parallel solutions of the fifth initial logical node and the sixth initial logical node, obtain the candidate computation costs of the fifth initial logical node and the sixth initial logical node and a transmission cost of the connection edge therebetween and take a sum of the two candidate computation costs and the transmission cost corresponding to the seventh connection edge as a fifth cost sum; in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; the predetermined configuration transformation assembly is configured to combine the fifth initial logical node and the sixth initial logical node of the fifth predetermined configuration into a second combined logical node, and combine the fifth connection edge and the sixth connection edge into a third combined connection edge, and assign the fifth cost sum obtained for the fifth predetermined configuration to the second combined logical node as one of the candidate computation costs and assign the third candidate transmission cost to the third combined connection edge as one of the candidate transmission costs.

According to another aspect of the present disclosure, there is provided a parallel decision method for distributed data processing, including: an initial logical node generation step of: receiving task configuration data input by a user to generate an initial logical node topology for the distributed data processing system, wherein each initial logical node is attached with a candidate parallel solution set based on the task configuration data, each candidate parallel solution specifies a initial logical node parallel solution to which the candidate parallel solution belongs and a candidate computation cost label based on the parallel solution, each connection edge between mutually-connected initial logical nodes is attached with a candidate transmission cost label, and the candidate transmission cost is determined by the respective parallel solutions of mutually-connected initial logical nodes; a logical node traversal step of: traversing the initial logical node topology to obtain a predetermined configuration in the initial logical node topology, wherein the predetermined configuration comprises a first predetermined configuration and/or a second predetermined configuration, the first predetermined configuration is an intermediate initial logical node with a first connection edge and a second connection edge, and the second predetermined configuration is paired initial logical nodes with multiple third connection edges therebetween; and, a predetermined configuration cost computation step of: for the first determined configuration, in a case of determining a candidate parallel solution of a first initial logical node of the first connection edge and a candidate parallel solution of a second initial logical node of the second connection edge, obtaining each candidate computation cost of the intermediate initial logical node, a first connection edge candidate transmission cost and a second connection edge candidate transmission cost corresponding to the obtained candidate computation cost and a first cost sum of the above three in a case of obtaining each candidate computation cost of each intermediate initial logical node, selecting a minimum first cost sum as a first candidate transmission cost between the first initial logical node and the second initial logical node in the first predetermined configuration in a case of determining the candidate parallel solution of the first initial logical node of each pair and the candidate parallel solution of the second initial logical node; and for the second predetermined configuration, in a case of determining the candidate parallel solution of a third initial logical node of the paired initial logical nodes and the candidate parallel solution of a fourth initial logical node of the paired initial logical nodes, performing summing for the candidate transmission costs of all connection edges between the paired initial logical nodes to obtain a second cost sum of the candidate transmission costs between the paired initial logical nodes as a second candidate transmission cost; a predetermined configuration transformation step of: transforming the first connection edge, the second connection edge and the intermediate initial logical node of the first predetermined configuration into a first combined connection edge between the first initial logical node of the first connection edge and the second initial logical node of the second connection edge, and assigning all first candidate transmission costs obtained for the first predetermined configuration to the first combined connection edge as one of the candidate transmission costs of the first combined connection edge, and transforming all connection edges of the second predetermined configuration into a second combined connection edge of the paired initial logical nodes, and assigning the second candidate transmission cost obtained for the second predetermined configuration to the second combined connection edge of the paired initial logical nodes as one of the candidate transmission costs of the second combined connection edge; and, a parallel decision step of: for a transformation result logical node topology and each sub-topology obtained by performing transformation by using the predetermined configuration transformation step, repeatedly traversing each final logical node or each final connection edge therein many times; by a local greedy strategy, obtaining a minimum cost sum of the transformation result logical node topology or each sub-topology; and based on an obtained total minimum cost of the transformation result logical node topology, obtaining a parallel solution corresponding to the transformation result logical node topology.

In the parallel decision method for distributed data processing according to the present disclosure, obtaining the predetermined configuration in the initial logical node topology further comprises obtaining a third predetermined configuration, which is an end initial logical node with only a fourth connection edge, wherein the predetermined configuration cost computation step is used to, for the third predetermined configuration, in a case of determining a candidate parallel solution of a dependent initial logical node to which the fourth connection edge of the third predetermined configuration is attached at the end initial logical node, obtain each candidate computation cost of the end initial logical node and a fourth connection edge candidate transmission cost corresponding to the candidate computation cost of the end initial logical node; obtain a third cost sum of the above two in a case of determining the candidate parallel solution of the dependent initial logical node; select a minimum third cost sum as a third additional computation cost in a case of determining the candidate parallel solution of the dependent initial logical node; and, the predetermined configuration transformation step is used to clip off the fourth connection edge and the end initial logical node of the third predetermined configuration and add the third additional computation cost to the computation cost of the dependent initial logical node.

In the parallel decision method for distributed data processing according to the present disclosure, obtaining the predetermined configuration in the initial logical node topology further comprises obtaining a fourth predetermined configuration, which comprises a fifth initial logical node and a sixth initial logical node which have no connection edge therebetween in a same connected component, and at least one seventh initial logical node connected to the fifth initial logical node and the sixth initial logical node, wherein the predetermined configuration cost computation step is used to, for the fourth predetermined configuration, in a case of determining the candidate parallel solutions of the fifth initial logical node and the sixth initial logical node, obtain the candidate computation costs of the fifth initial logical node and the sixth initial logical node and take a sum of the two candidate computation costs as a fourth cost sum; and in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; and, the predetermined configuration transformation step is used to combine the fifth initial logical node and the sixth initial logical node of the fourth predetermined configuration into a first combined logical node, and combine the fifth connection edge and the sixth connection edge into a third combined connection edge, and assign the fourth cost sum obtained for the fourth predetermined configuration to the first combined logical node as one of the candidate computation costs and assign the third candidate transmission cost to the third combined connection edge as one of the candidate transmission costs.

In the parallel decision method for distributed data processing according to the present disclosure, obtaining the predetermined configuration in the initial logical node topology further comprises obtaining a fifth predetermined configuration, which comprises a fifth initial logical node and a sixth initial logical node which have a seventh connection edge therebetween in a same connected component, and at least one seventh initial logical node connected to the fifth initial logical node and the sixth initial logical node, wherein the predetermined configuration cost computation step is used to, for the fifth predetermined configuration, in a case of determining the candidate parallel solutions of the fifth initial logical node and the sixth initial logical node, obtain the candidate computation costs of the fifth initial logical node and the sixth initial logical node and a transmission cost of the connection edge therebetween and take a sum of the two candidate computation costs and the transmission cost corresponding to the seventh connection edge as a fifth cost sum; in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; the predetermined configuration transformation step is used to combine the fifth initial logical node and the sixth initial logical node and the seventh connection edge of the fifth predetermined configuration into a second combined logical node, and combine the fifth connection edge and the sixth connection edge into a third combined connection edge, and assign the fifth cost sum obtained for the fifth predetermined configuration to the second combined logical node as one of the candidate computation costs and assign the third candidate transmission cost to the third combined connection edge as one of the candidate transmission costs.

In the parallel decision system and method for distributed data processing according to the present disclosure, a solution space faced by the parallel decision of distributed data processing is reduced as possible from a global angle, so as to increase the feasibility of performing automatic parallel decision and reduce the difficulty of the automatic parallel decision. Further, the parallel result obtained by the parallel decision has low computation cost and transmission cost, so as to increase, as possible, the computation efficiency of the same computation task based on fixed computation resources, and thus speed up data processing. More importantly, the automatic parallel decision is implemented while the lowest transmission cost is approximated as possible, thereby greatly reducing the costs of manual debugging.

The other advantages, objects, and features of the present disclosure will be partially reflected by the following descriptions and partially understood by those skilled in the art by studying and practicing the present disclosure.

BRIEF DESCRIPTIONS OF THE DRAWINGS

DETAILED DESCRIPTIONS OF EMBODIMENTS

Figure 1:
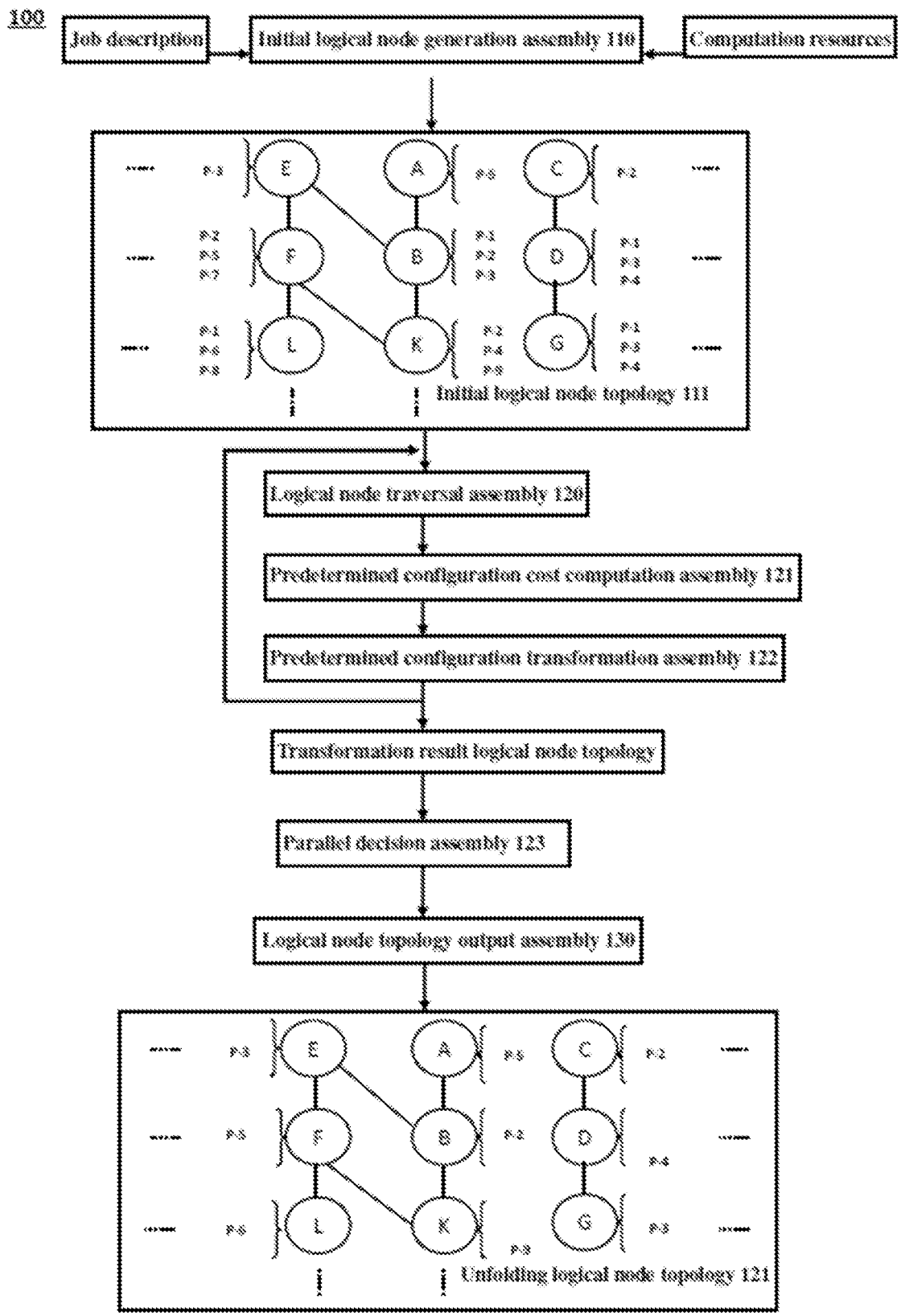
FIG. 1 is a principle schematic diagram illustrating a parallel decision system for distributed data processing according to one embodiment of the present disclosure.

The present disclosure will be further detailed in combination with embodiments and drawings to enable those skilled in the arts to implement the present disclosure by referring to the specification.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are to describe particular examples only and are not intended to limit the present disclosure. Terms determined by "a", "the" and "said" in their singular forms in the present disclosure and the appended claims are also intended to include a plurality unless indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, as shown below, one of two possible objects may be referred to as a fifth initial logical node or a sixth initial logical node, and the other of the two possible objects may be referred to as a second logical distributed signature or first logical distributed signature. Depending on the context, the term "if" as used herein may be interpreted as "when" or "upon" or "in response to determining".

In order to help those skilled in the art to better understand the present disclosure, further detailed descriptions will be made to the present disclosure in combination with drawings and specific embodiments.

FIG. 1 is a principle schematic diagram illustrating a parallel decision system 100 for distributed data processing according to an embodiment of the present disclosure. As shown in FIG. 1, the distributed signature decision system 100 includes an initial logical node generation assembly 110, a logical node traversal assembly 120, a predetermined configuration cost computation assembly 121, a predetermined configuration transformation assembly 122, and a parallel decision assembly 123. The initial logical node generation assembly 110 receives task configuration data and computation resource data input by a user to generate an initial logical node topology 111 for distributed data processing. After a job is input, the distributed data processing system may, based on job descriptions input by the user, automatically decompose the job into many tiny job tasks which are formed by various operation components. These operation components, as logical nodes, are interconnected back and forth to form an initial tensor processing neural network topology. Each layer of network of these neural networks includes many logical nodes and two layers of neighboring neural networks are interconnected, so as to provide a direction for the placement of an execution subject for executing actual job processing in the distributed data processing system. FIG. 1 only illustrates a simple initial logical node topology 111, where initial logical nodes A, B, C, D, E, F, L, and K are shown with an ellipsis representing those omitted logical nodes. In practical distributed data processing, the initial logical node topology 111 will be more complex. The initial logical node topology 111 includes basic operation nodes for implementing the computation task described by the user. The initial logical node topology 111 is an undirected graph obtained by converting a directed acyclic graph. The generation mode of the initial logical node topology 111 is a conventional technical means in the prior arts and will not be repeated herein.

Each initial logical node of the initial logical node topology 111 includes multiple candidate parallel strategies. The candidate parallel strategies may be named based on the actual requirements of the user. Once the parallel strategy of one initial logical node is selected from the multiple candidate parallel strategies, the parallel mode of the initial logical node is also determined. The candidate parallel strategies may be classified comprehensively into multiple parallels based on the parallel object and parallel position, for example, parallel on several devices, parallel on the same device, and parallel on several working stations. Thus, all parallel strategies may be numbered in a unified way as parallel strategies P1, P2, P3, P4, P5, P6, and so on. In the formed initial logical node topology 111, each initial logical node has multiple candidate parallel strategy P signatures. For a source logical node configured with a P signature by a user, or an initial logical node for which a unique P signature is determined based on task descriptions of the user, for example, the initial logical nodes A, E, and C, they only have a unique P signature, for example, the initial logical node A has P-5, the initial logical node C has P-2, and the initial logical node E has P-3. In some cases, some initial logical nodes may have multiple candidate P signatures, but the user may specify that one or more initial logical nodes can only use one P signature based on the requirements of a specific task. When the unique P signature is not determined, the initial logical node usually includes some inherent candidate P signatures. As shown in FIG. 1, the initial logical node B has multiple candidate P signatures, for example, three signatures, which are P-1, P-2, and P-3. Other initial logical nodes may also have different candidate P signatures respectively, which will not be described one by one herein. Different initial logical nodes may have different fixed candidate P signatures based on different operations to be specifically performed.

Therefore, after receiving the task configuration data and the computation resource data input by the user, the initial logical node generation assembly 110 generates the initial logical node topology 111 for the distributed data processing system. Each initial logical node in the initial logical node topology 111 is attached with a candidate parallel solution set based on the task configuration data. For example, the initial logical node B has multiple candidate P signatures, for example, three, which are P-1, P-2, and P-3. Each candidate parallel solution specifies an initial logical node parallel solution to which the candidate parallel solution belongs. Each initial logical node is further attached with a parallel solution-based candidate computation cost label C based on the task configuration data. The computation cost of each initial logical node is based on its data processing type, data block size, and its own parallel mode, where the computation cost C is an empirical value. For example, the parallel decision of node B is numbered P2, and its computation cost is C2. Similarly, if the parallel decision of node B is numbered $P_k$, its computation cost is $C_k$. The way of obtaining the empirical value of the computation cost is a conventional technical means. For each logical node, the computation time of the logical node under different candidate data parallel decisions may be measured, that is, a computation amount is divided by a computation rate. By using a large number of tests, the running time required for one unit of computation amount can be measured and estimated. The computation time is referred to as the computation cost of the logical node and is stored in one array to ensure the computation cost of the logical node under a specific candidate parallel strategy can be obtained in O(1) (constant) time. Therefore, no detailed descriptions are made herein.

Furthermore, each connection edge between any two interconnected initial logical nodes is attached with a candidate transmission cost label Ct, and the candidate transmission cost Ct is determined by respective candidate parallel solutions of the interconnected initial logical nodes. For example, when the parallel decision numbers of the initial logical nodes E and B are P2 and P3, the transmission cost label of the connection edge between them is Ct. The transmission cost label may also be marked visually with a candidate decision number. By using the two-dimensional array $C_{t[P2][P3]}$, the transmission cost of the connection edge therebetween when the parallel decision numbers of the initial logical nodes E and B are P2 and P3 is represented. Because the computation graph of the logical node topology is a directed graph, after the directed graph is converted into an undirected graph, each connection edge of the computation graph represents data transmission from one node to another node of this edge. The transmission time required between the two end nodes of this edge under different data distribution decisions can be measured and referred to as transmission cost. Specifically, by a large number of tests, bandwidth can be measured and the time required for transmitting one unit of computation amount between the two nodes can be estimated. Finally, the transmission costs of this edge under different decisions of both ends are stored in one two-dimensional array (e.g. $C_{t[Pi][Pj]}$) of this edge to ensure a constant access time.

The P signature in the present disclosure is a signature applied to a distributed data processing system. In the distributed data processing system, since the circumstances such as data parallel, model parallel, hybrid parallel, and streaming parallel frequently occur, the tasks of adjacent logical nodes are usually simultaneously deployed to different computing devices. In a practical data processing process, intermediate parameters may be exchanged between different computing devices, resulting in a huge transmission overhead. Different initial logical nodes may select different parallel strategies, and thus different transmission overheads or transmission costs will be generated. Since there are many initial logical nodes, different parallel strategy combinations will be up to an enormous number. Thus, it is extremely difficult to manually select a parallel decision combination with a small cost. In the case of automatic selection, since the combination number is very huge, a huge operation overhead will result from the automatic selection.

To reduce the difficulty of performing parallel decision selection in face of an enormous number of parallel decision combinations, reduction processing can be performed on the initial logical node topology to obtain a simpler logical node topology, facilitating automatic selection for the parallel modes. In the present disclosure, the logical node traversal assembly 120 traverses the initial logical node topology to obtain multiple predetermined configurations F in the initial logical node topology. These predetermined configurations F are changed to simple sub-graph structures by the reduction method of the present disclosure. By repeating iterative reduction, an extremely simple logical node topology for helping parallel decision selection can be finally obtained.

Figure 2:
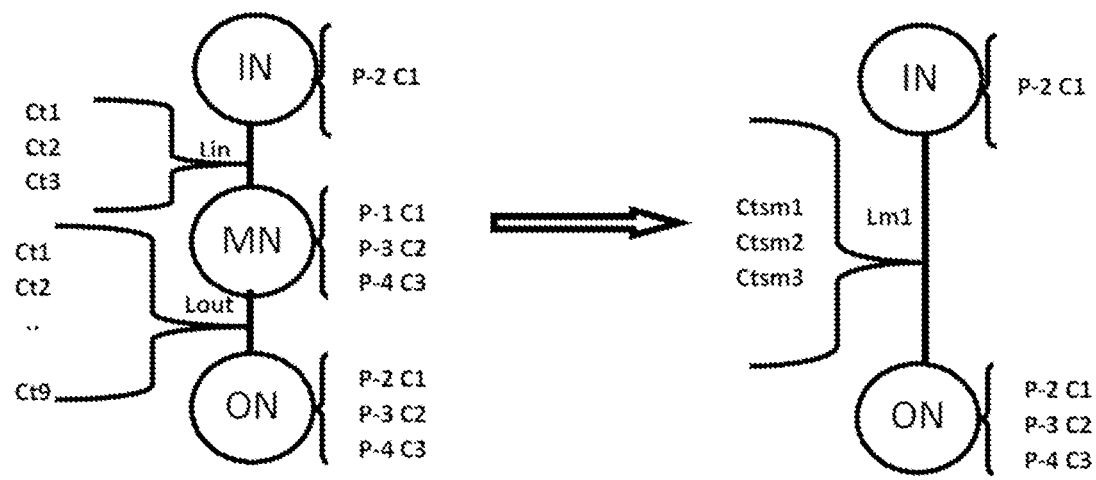
FIG. 2 is a schematic diagram illustrating a first predetermined configuration according to the present disclosure.

FIG. 2 is a schematic diagram illustrating a first predetermined configuration according to the present disclosure. As shown in FIG. 1, the first predetermined configuration F1 is an intermediate initial logical node MN with a first connection edge Lin and a second connection edge Lout. An input end of the first connection edge Lin of the first predetermined configuration F1 is connected to a first initial logical node IN, and an output end of the second connection edge Lout is connected to a second initial logical node ON. Returning to refer to FIG. 1, the initial logical node D is an intermediate initial logical node MN, and the initial logical nodes C and G are the first initial logical node IN and the second initial logical node ON respectively. Therefore, the initial logical nodes C, D, and G in FIG. 1 form the first predetermined configuration F1.

As shown in FIG. 2, in one first predetermined configuration F1, each initial logical node is attached with a candidate parallel label P and a computation cost label C corresponding to the candidate parallel label. For example, the initial logical node IN has a corresponding computation cost label C1 under the candidate parallel label P2; the intermediate initial logical node MN has a corresponding computation cost label C1 under the candidate parallel label P1, and has a corresponding computation cost label C2 under the candidate parallel label P2, and has a corresponding computation cost label C3 under the candidate parallel label P4. Similarly, the second initial logical node ON has a corresponding computation cost label C1 under the candidate parallel label P2, has a corresponding computation cost label C2 under the candidate parallel label P3, and has a corresponding computation cost label C3 under the candidate parallel label P4. It is to be noted that, for ease of description, although the same computation cost label, for example, C1 or C2, is used in different initial logical nodes, the computation cost label attached to the different initial logical nodes does not represent the same computation cost. These computation cost labels are only used to represent different computation costs under different candidate parallel strategies in the same initial logical node. In the practical application process, these cost labels are denoted by the actual cost values. The marking manner also only serves for marking in subsequent displaying or descriptions of other predetermined configurations and does not mean the same cost label represents the same computation cost.

As shown in FIG. 2, the first connection edge Lin has different transmission costs in the case of determining respective candidate parallel strategies P of the first initial logical node IN and the intermediate initial logical node MN and determining the computation resources. For example, as shown in FIG. 2, the first initial logical node IN has one candidate parallel strategy and the intermediate initial logical node MN has three candidate parallel strategies, thus there will be three transmission modes obtained by combination. Hence, the three transmission modes correspond to three transmission costs, Ct1, Ct2, and Ct3. Similarly, as shown in FIG. 2, the intermediate initial logical node MN has three candidate parallel strategies and the intermediate initial logical node MN has three candidate parallel strategies, and thus there will be nine transmission modes obtained by combination, and the nine transmission modes correspond to nine transmission costs: Ct1, Ct2, Ct3, Ct4, Ct5, Ct6, Ct7, Ct8, and Ct9. Likewise, it should be noted that, for ease of description, although the same transmission cost label, for example, Ct1 or Ct2, is used in different connection edges, the transmission cost label attached to different connection edges does not represent the same transmission cost. It is used only to represent different transmission costs under different candidate parallel strategy combinations in the same connection edge. In the practical application process, these transmission cost labels are denoted by actual transmission cost values.

Returning to FIG. 1, when the logical node traversal assembly 120 finds the first predetermined configuration F1 when traversing each initial logical node in the initial logical node topology, the predetermined configuration cost computation assembly 121 is configured to, for the first predetermined configuration, in a case of determining the candidate parallel solution of the first initial logical node IN of the first connection edge and the candidate parallel solution of the second initial logical node ON of the second connection edge, obtain each candidate computation cost of the intermediate initial logical node, a first connection edge candidate transmission cost Ct and a second connection edge candidate transmission cost Ct corresponding to the obtained candidate computation cost C and a first cost sum Cs of the above three in a case of obtaining each candidate computation cost of each intermediate initial logical node, select a minimum first cost sum Csm as one of first candidate transmission costs between the first initial logical node and the second initial logical node in the first predetermined configuration in a case of determining the candidate parallel solution of the first initial logical node IN of each pair and the candidate parallel solution of the second initial logical node ON.

Specifically, as shown in FIG. 1, the first predetermined configuration F1 includes the initial logical nodes C, D, and G which respectively correspond to the first initial logical node IN, the intermediate initial logical node MN and the second initial logical node ON. The connection edge CD between the initial logical nodes C and D corresponds to the first connection edge Lin, and the connection edge between the initial logical nodes D and G corresponds to the second connection edge Lout. When the initial logical node C selects the candidate parallel decision P-i (i is a serial number of the candidate parallel decision of the initial logical node C), and the initial logical node D selects the candidate parallel decision P-k (k is a serial number of the candidate parallel decision of the initial logical node D), the transmission cost of the connection edge CD is $Cost_{CD}[i][k]$, where (i, k) is denoted as a decision group of the connection edge CD. In this case, multiple transmission costs $Cost_{CD}$[i][k] corresponding to the decision group (i, k) of the connection edge CD are sequentially marked as the candidate transmission costs C1, C2, . . . of the connection edge CD, or as two-dimensional array C11, C12, . . . , C1n, C21, C22, . . . , C2n, . . . , Cm1, Cm2, Cmn. Similarly, when the initial logical node D selects the candidate parallel decision P-k (k is a serial number of the candidate parallel decision of the initial logical node D), and the initial logical node G selects the candidate parallel decision P-j (j is a serial number of the candidate parallel decision of the initial logical node G), the transmission cost of the connection edge DG is $Cost_{DG}$ where (k, j) is denoted as a decision group of the connection edge DG. In this case, multiple transmission costs $Cost_{DG}$ [j] corresponding to the decision group (k, j) of the connection edge DG is sequentially marked as the candidate transmission costs C1, C2, . . . of the connection edge DG.

When the candidate parallel decisions of the initial logical nodes C, G, and D are determined as P-i, P-j, and P-k, the predetermined configuration cost computation assembly 121 firstly obtains the transmission cost of the connection edge CD as $Cost_{CD}$[i][k], the transmission cost of the connection edge DG as $Cost_{DG}$ [k][j], and the computation cost of the initial logical node D serving as the intermediate initial logical node MN as $Cost_D$[k], and then performs summing for them, where the sum is denoted as $Cost_{CG}$[i][j]. In this case, when the candidate parallel decisions of the initial logical nodes C and G are determined, the number of the candidate parallel decisions of the initial logical node D serving as the intermediate initial logical node MN is determined, for example, as 3. Thus, the predetermined configuration cost computation assembly 121 obtains three cost sums $Cost_{CG}$[i][j] for the initial logical nodes C and G with a group of determined candidate parallel decisions as follows:

$$Cost_{CD}[i][1]+Cost_D[1]+Cost_{DG}[1][j]$$

$$Cost_{CD}[i][2]+Cost_D[2]+Cost_{DG}[2][j]$$

$$Cost_{CD}[i][3]+Cost_D[3]+Cost_{DG}[3][j].$$

The predetermined configuration cost computation assembly 121 may select a minimum sum value from the above three first cost sums and $Cost_{CG}$[i][j] as the minimum cost sum Csm which is used as one of the first candidate transmission costs between the first initial logical node and the second initial logical node in the first predetermined configuration in a case of determining the candidate parallel solution of the first initial logical node IN of each pair and the candidate parallel solution of the second initial logical node ON. When (i, j) is the decision group of the connection edge CG, the corresponding minimum cost sum Ctsm is:

$$Ctsm = Cost_{CG}[i][j] = \min_{1 \le k \le n}\{Cost_{CD}[i][k] + Cost_D[k] + Cost_{DG}[k][j]\}$$

In the formula, n refers to the number of the candidate parallel decisions of the intermediate initial logical nodes MN. The formula represents selecting a minimum value from n first cost sums as one of the first candidate transmission costs of the decision group of the connection edge CG. If the numbers of the candidate parallel decisions of the initial logical node C and the initial logical node D are X and Y respectively, X×Y first candidate transmission costs will be finally obtained, where each first candidate transmission cost is a minimum first cost sum of n first cost sums Csm corresponding to one decision group of (i, j) CG.

Subsequently, the predetermined configuration transformation assembly 122 transforms the first connection edge Lin, the second connection edge Lout, and the intermediate initial logical node MN in the first predetermined configuration F1 into a first combined connection edge Lm1 between the first initial logical node In of the first connection edge and the second initial logical node ON of the second connection edge. FIG. 2 shows a process of the transformation. FIG. 2 shows the original structure of the first predetermined configuration F1 at the left side and the after-transform topological structure at the right side. After transforming, the first combined connection edge Lm1 has three first candidate transmission costs Ctsm1, Ctsm2, and Ctsm3. The number of the first candidate transmission costs is equal to a product of the number of the candidate parallel solutions of the first initial logical node IN of each pair and the number of candidate parallel solutions of the second initial logical node ON.

As shown in FIG. 2, the predetermined configuration transformation assembly 122 performs a transformation on the first predetermined configuration F1, which, on one hand, reduces the logical nodes to be determined and on the other hand, reduces the connection edges to be determined. Therefore, the difficulty of performing decisions on the entire parallel strategy for the entire logical node topology can be significantly reduced, and the selection of a locally-minimized cost sum provides conditions for selecting a relatively small parallel cost entirely as possible.

After the predetermined configuration transformation assembly 122 performs the transformation for the first predetermined configuration F1, the predetermined configuration transformation assembly 122 re-arranges the logical nodes in the transformed structure at the end of the traversed logical queue, to help iterative traversal. That is, multiple traversals are performed for the entire logical node topology until the first predetermined configuration F1 cannot be traversed.

Figure 3:
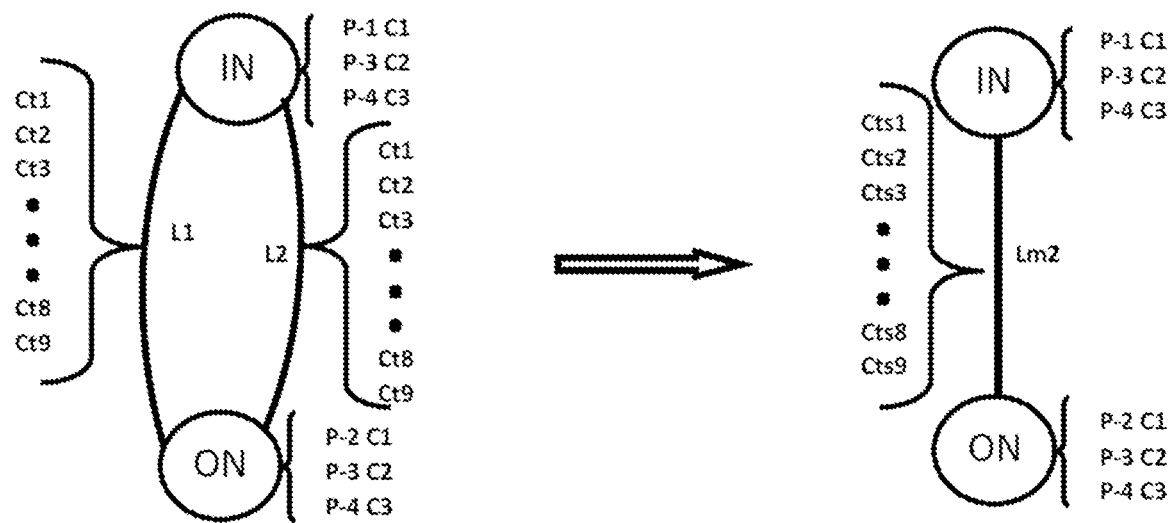
FIG. 3 is a schematic diagram illustrating a second predetermined configuration according to the present disclosure.

Returning to FIG. 1, the logical node traversal assembly 120 traverses the initial logical node topology to obtain a second predetermined configuration F2 in multiple predetermined configurations F in the initial logical node topology. The second predetermined configuration F2 is paired initial logical nodes with multiple third connection edges therebetween. FIG. 3 is a schematic diagram illustrating the second predetermined configuration of the present disclosure. As shown in FIG. 3, the second predetermined configuration F2 has paired initial logical nodes of a third initial logical node IN and a fourth initial logical node ON, where there are at least two or more third connection edges L1 and L2 and so on between the third initial logical node IN and the fourth initial logical node ON. For ease of description, FIG. 3 only shows two third connection edges. In practical circumstances, there may be three or more third connection edges. The initial logical node topology shown in FIG. 1 is only a part of an illustrative topology and does not show the second predetermined configuration F2 but does not mean there is no second predetermined configuration F2 in all initial logical node topologies.

As shown in FIG. 3, each of the third initial logical node IN and the fourth initial logical node ON has three candidate parallel strategies and there are two third connection edges L1 and L2 between them, and alternatively, there may be other third connection edges, for example, L3 and L4 (not shown). When the parallel strategies of the paired initial logical nodes IN and ON are determined, if the computation resources are determined, the respective transmission costs of the third connection edges L1 and L2 are also determined. Since the third initial logical node IN and the fourth initial logical node ON have three candidate parallel strategies respectively, there may be nine parallel strategy combinations therebetween and the connection edges L1 and L2 also respectively have nine candidate transmission costs, for example, Ct1, Ct2, Ct3, . . . Ct8, and Ct9, each of which corresponds to one parallel decision combination.

When the respective candidate parallel strategies of the third initial logical node IN and the fourth initial logical node ON are determined as P-i and P-j, the predetermined configuration cost computation assembly 121 firstly obtains the transmission costs of the connection edges L1 and L2 as $Cost_{L1}[i][j]$ and $Cost_{L2}[i][j]$, and then computes the transmission cost sum of the connection edges of the paired output logical nodes IN and ON under one group of (i, j) candidate decisions in the following formula:

$$Cts = Cost_{Lm}[i][j] = \sum_{k=1}^{z} Cost_{Lk}[i][j]$$

In the above formula, k refers to the serial number of the connection edge, z refers to a number of connection edges between the paired output logical nodes IN and ON, and Cts refers to a transmission cost sum which can be also denoted by CostLm[i][j]. For one group of (i, j) candidate parallel decision combinations of the paired output logical nodes IN and ON, one transmission cost sum Cts is formed, for example, Cts1, Cts2, Cts3, . . . Cts8, Cts9 at the left side of FIG. 3.

Next, the predetermined configuration transformation assembly 122 transforms the connection edge between the paired output logical nodes IN and ON of the second predetermined configuration F2 into a second combined connection edge Lm2 between the paired output logical nodes IN and ON. FIG. 3 shows a process of the transformation. FIG. 3 shows the original structure of the second predetermined configuration F2 at the left side and the after-transform topological structure at the right side. After transforming, the second combined connection edge Lm2 has nine second candidate transmission costs Cts1, Cts2, Cts3, . . . Cts8, Cts9. The number of the second candidate transmission costs is equal to a product of the numbers of the respective candidate parallel solutions of the paired output logical nodes IN and ON. Each second candidate transmission cost Cts includes one corresponding combination of the respective candidate parallel solutions of the paired output logical nodes IN and ON.

After the predetermined configuration transformation assembly 122 performs the transformation on the second predetermined configuration F2, the predetermined configuration transformation assembly 122 re-arranges the logical nodes in the transformed structure at the end of the traversed logical queue, to help iterative traversal. That is, multiple traversals are performed for the entire logical node topology until the second predetermined configuration F2 cannot be traversed.

Figure 4:
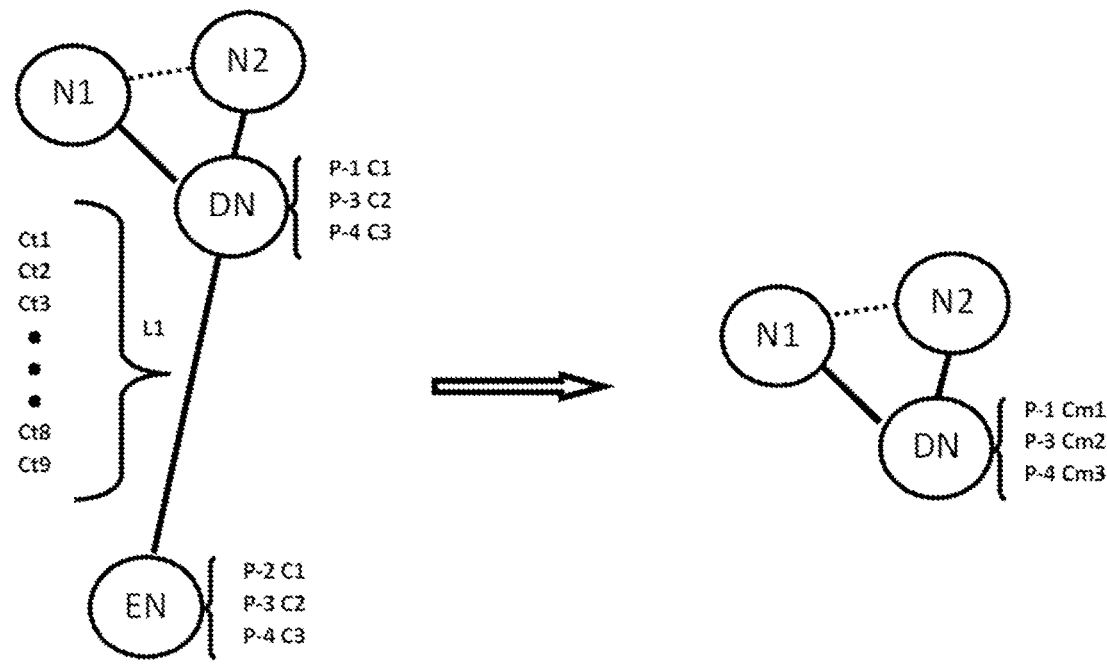
FIG. 4 is a schematic diagram illustrating a third predetermined configuration according to the present disclosure.

Returning to FIG. 1, the logical node traversal assembly 120 traverses the initial logical node topology to obtain a third predetermined configuration F3 in multiple predetermined configurations F in the initial logical node topology. FIG. 4 is a schematic diagram illustrating the third predetermined configuration of the present disclosure. As shown in FIG. 4, the third predetermined configuration F3 is an end initial logical node EN with only a fourth connection edge L1, where the end initial logical node EN is connected to a dependent initial logical node DN through the fourth connection edge. The dependent initial logical node DN is also connected to other initial logical nodes through a connection edge, for example, N1 and N2. There may be a connection edge or no connection edge between N1 and N2. Therefore, N1 and N2 are connected by a dotted line in FIG. 4. For ease of description, FIG. 4 only shows two other initial logical nodes of the dependent initial logical node DN, and actually, there may be more other initial logical nodes or no other initial logical nodes. The initial logical node topology shown in FIG. 1 is only a part of an illustrative topology and does not show the third predetermined configuration F3 but does not mean there is no third predetermined configuration F3 in all initial logical node topologies. As shown in FIG. 4, since the dependent initial logical node DN and the end initial logical node EN have three candidate parallel strategies respectively, there are nine parallel strategy combinations between them. Thus, the fourth connection edge has nine candidate transmission costs, for example, Ct1, Ct2, Ct3, . . . Ct8, and Ct9, each of which corresponds to one parallel decision combination. When respective candidate parallel decisions of the dependent initial logical node DN and the end initial logical node EN are determined as P-i and P-j, the predetermined configuration cost computation assembly 121 firstly obtains respective computation costs $Cost_{DN}[i]$ and $Cost_{EN}[j]$ of the dependent initial logical node DN and the end initial logical node EN under the determined candidate parallel decisions and the transmission cost $Cost_{L1}[i][j]$ of the fourth connection edge L1, and then computes a cost sum of the computation cost $Cost_{EN}[j]$ and the transmission cost $Cost_{L1}[i][j]$ of the fourth connection edge L1. In a case that the candidate parallel decision of the dependent initial logical node DN is unchanged, for the candidate parallel decisions P-j of different end initial logical nodes EN, a cost sum of them is computed (when the number of the candidate parallel decisions of the end initial logical node EN is 3).

$Cost_{L1}[i][1]+Cost_{EN}[1]$ $Cost_{L1}[i][2]+Cost_{EN}[2]$ $Cost_{L1}[3]+Cost_{EN}[3]$ For the cost sums of both, a minimum cost sum in the case that the candidate parallel decision P-i of the dependent initial logical node DN is unchanged is selected as a minimum third cost sum. For this, the above formulas can be integrated into the following formula:

$$Cost_m[i] = \MIN_{1 \leq j \leq n}\{Cost_{L1}[i][j] + Cost_{EN}[j]\}$$

In the above formula, n refers to a number of the candidate parallel decisions of the end initial logical node EN. The predetermined configuration cost computation assembly 121 may, for the third predetermined configuration, obtain n minimum third cost sums as a third additional computation cost $Cost_m[i]$ of (P-i) in a case of determining the candidate parallel solution of the dependent initial logical node DN.

Subsequently, predetermined configuration transformation assembly 122 clips off the fourth connection edge and the end initial logical node EN of the third predetermined configuration F3 and transforms the third predetermined configuration F3 into a new single logical node DN, and adds the third additional computation cost to the computation cost $\text{Cost}_{DN}[i]$ of the dependent initial logical node DN to form a new computation cost Cmi of the dependent initial logical node DN, as shown by the following formula:

$$Cmi = \text{Cost}_{DNm}[i] = \underset{1 \leq j \leq n}{\text{MIN}}\{\text{Cost}_{DN}[i] + \text{Cost}_{L1}[i][j] + \text{Cost}_{EN}[j]\}$$

As shown in FIG. 4, the predetermined configuration transformation assembly 122 performs a transformation on the third predetermined configuration F3, which, on one hand, reduces the logical nodes to be determined and on the other hand, reduces the connection edges to be determined. Therefore, the difficulty of performing decisions on the entire parallel strategy for the entire logical node topology can be significantly reduced, and the selection of a locally-minimized cost sum provides conditions for selecting a relatively small parallel cost entirely as possible.

After the predetermined configuration transformation assembly 122 performs the transformation for the third predetermined configuration F3, the predetermined configuration transformation assembly 122 re-arranges the logical nodes in the transformed structure at the end of the traversed logical queue, to help iterative traversal. That is, multiple traversals are performed for the entire logical node topology until the third predetermined configuration F3 cannot be traversed. The new computation cost of the transformed dependent initial logical node DN is used as a subsequently-processed computation cost.

Figure 5:
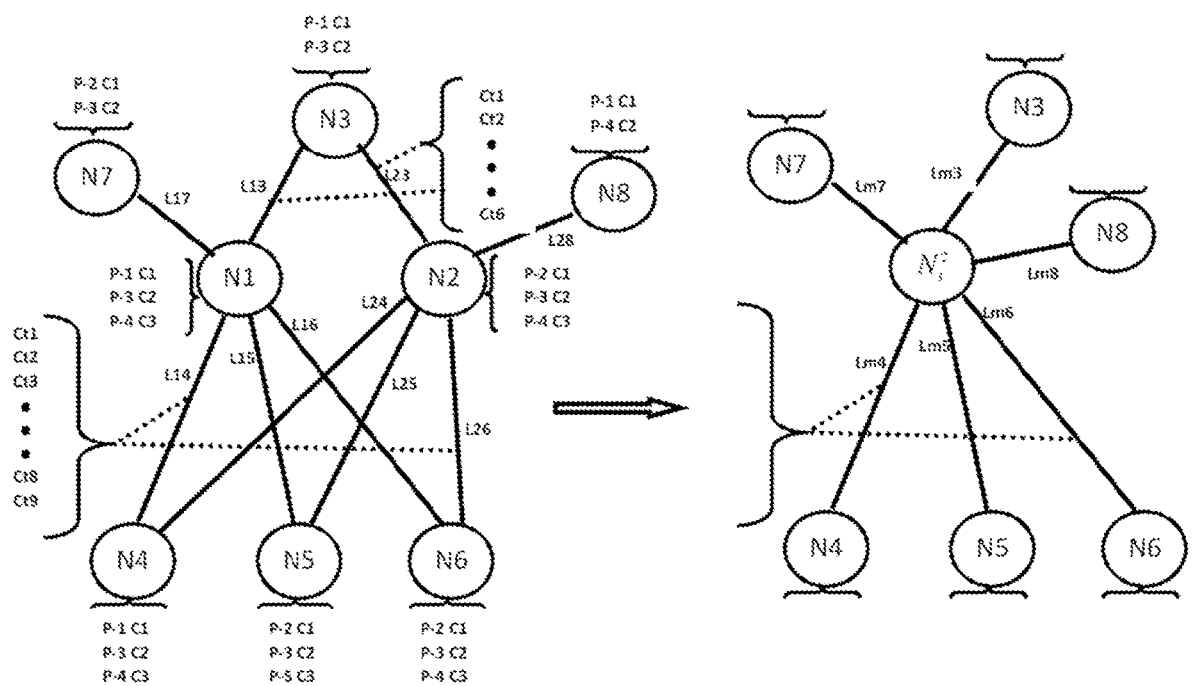
FIG. 5 is a schematic diagram illustrating a fourth predetermined configuration according to the present disclosure.

Returning to FIG. 1, when the logical node traversal assembly 120 fails to obtain the first, second, and third predetermined configurations by traversing all logical node queues to be traversed, the logical node traversal assembly 120 starts to traverse the initial logical node topology to obtain a fourth predetermined configuration F4 in multiple predetermined configurations F in the initial logical node topology. FIG. 5 is a schematic diagram illustrating the fourth predetermined configuration F4 of the present disclosure. As shown in FIG. 5, the fourth predetermined configuration F4 includes a fifth initial logical node N1 and a sixth initial logical node N2 without a connection edge therebetween in a same connected component and at least one seventh initial logical node N3, N4, N5, N6 and the like shared by the fifth initial logical node N1 and the sixth initial logical node N2. Furthermore, the fourth predetermined configuration F4 may also include an initial logical node N7 only connected with the fifth initial logical node N1. The fourth predetermined configuration F4 may also include an initial logical node N8 only connected with the sixth initial logical node N2. The connection edge between any two initial logical nodes is L, for example, the connection edge between N1 and N4 is L14, the connection edge between N2 and N5 is L25, and so on.

When the logical node traversal assembly 120 traverses the initial logical nodes in the topology to obtain the fourth predetermined configuration F4, a product of the numbers of the candidate parallel decisions of the fifth initial logical nodes N1 and the sixth initial logical nodes N2 forming the fourth predetermined configuration F4 shall not be greater than a preset threshold, for example, 128 or 64 or the like. If there is no threshold limitation, the fourth predetermined configuration F4 can be traversed repeatedly in a complete topological structure diagram. Finally, one logical node is formed in the complete topological structure diagram, and the traversal time is lengthened. Further, the final parallel decision determination is very lengthy. On the other hand, because a large amount of label data such as computation cost, transmission cost, and cost sum, etc. may be generated when the fifth initial logical node N1 and the sixth initial logical node N2 of the fourth predetermined configuration F4 are combined if the number of the candidate parallel decisions of the fifth initial logical node N1 and the sixth initial logical node N2 of the fourth predetermined configuration F4 is too large, larger memory space is required to store these label data. In this case, the nodes and connection edges in the combined topology occupy excessively large data space. For example, the space occupied by the combined nodes is O (threshold) and the space occupied by the combined connection edges is O (square of threshold). Therefore, in order to reduce data space occupation, it is necessary to perform threshold limitation when the predetermined configuration F4 performs candidate parallel decisions. Limitations may be made to the initial logical nodes and the initial connection edges, and it is acceptable to input the nodes with a candidate decision number greater than the threshold. It is to be noted that, the combined nodes shall not be further combined with other nodes. Therefore, without threshold limitation, the combination in the fourth predetermined configuration F4 will be continued until a large node with one candidate decision number being a product of the candidate decision numbers of all original nodes, which is inadvisable.

Optionally, when traversing the initial logical nodes in the topology to obtain the fourth predetermined configuration F4, the logical node traversal assembly 120 needs to traverse the fourth predetermined configuration F4 with a possibly high overlap degree of the direct neighborhood. The direct neighborhood refers to a set of one logical node and all logical nodes connected to one logical node. For the fifth initial logical node N1 and the sixth initial logical node N2 forming the fourth predetermined configuration F4, if the product of their candidate decisions is less than or equal to the threshold O, the overlap degree of the direct neighborhood between them can be found based on the set comparison algorithm of bit operation, and one pair of nodes with the highest overlap degree is recorded for node combination. The larger the overlap degree is, the more the connection edges combined are. The logical node traversal assembly 120 preferentially traverses the fourth predetermined configuration F4 with the highest overlap degree, which satisfies the threshold limitation.

In the case of determining the candidate parallel solutions of the fifth initial logical node N1 and the sixth initial logical node N2, the predetermined configuration cost computation assembly 121 obtains the candidate computation costs of the fifth initial logical node and the sixth initial logical node and takes a sum of the two candidate computation costs as a fourth cost sum.

If the fifth initial logical node N1 has m candidate decisions $\{0, 1, 2, \ldots, m-1\}$ and the sixth initial logical node N2 has n candidate decisions $\{0, 1, 2, \ldots, n-1\}$, in a case of determining the candidate parallel solutions of the fifth initial logical node N1 and the sixth initial logical node N2, for example, the candidate parallel decision combination of both being (i, j), the corresponding combination serial number is k, where k=i*n+j. At this time, the candidate computation cost of the fifth initial logical node N1 is Cost$_{N1}$[i] and the candidate computation cost of the sixth initial logical node N2 is Cost$_{N2}$[j], and the cost sum of the parallel decision combination of both is denoted as Cost N$_1^2$ [k].

$$\text{Cost } N_1^2[k] = \text{Cost}_{N1}[k/n] + \text{Cost}_{N2}[k \% n]$$

In the above formula, k/n refers to a quotient of k divided by n, and k % n refers to a remainder of k divided by n. The predetermined configuration cost computation assembly 121 takes a sum of the candidate transmission costs of the fifth initial logical node N1 and the sixth initial logical node N2 as a fourth cost sum.

As shown in FIG. 5, each of the seventh initial logical nodes N3, N4, N5, and N6 is connected with the fifth initial logical node N1 and the sixth initial logical node N2 at the same time. For example, the seventh initial logical node is N4, and the connection edges with the fifth initial logical node N1 and the sixth initial logical node N2 are L14 and L24 respectively. When the parallel decision combination (e.g. P-i, P-j) of the fifth initial logical node N1 and the sixth initial logical node N2 is determined, for any candidate parallel decision numbered r of the seventh initial logical node N4, the transmission costs Cost$_{L14}$ and Cost$_{L24}$ of the connection edges L14 and L24 can also be determined in a case of determining the computation resources. For the candidate parallel decision combination (i, j) of both with the combination serial number k, a sum of the transmission costs of the connection edges L14 and L24 may be generally expressed as:

$$\text{Cost}_{Lmr}[k][r] = \text{Cost}_{L14}[k/n][r] + \text{Cost}_{L24}[k \% n][r]$$

In the above formula, k/n refers to a quotient of k divided by n, k % n refers to a remainder of k divided by n, and r is a serial number of the candidate parallel decision of the seventh initial logical node.

As shown in FIG. 5, the fourth predetermined configuration F4 may further include the initial logical node N7 only connected with the fifth initial logical node N1. The fourth predetermined configuration F4 may further include the initial logical node N8 only connected with the sixth initial logical node N2. The transmission cost of the connection edge L17 between the initial logical node N7 serving as an eighth initial logical node and the fifth initial logical node N1 is not changed. For the candidate parallel decision combination (i, j) of the fifth initial logical node N1 and the sixth initial logical node N2, the candidate transmission cost of the connection edge L17 of the eighth initial logical node N7 with the candidate parallel decision serial number being s can be expressed as follows:

$$\text{Cost}_{Lms}[k][s] = \text{Cost}_{L17}[k/n][s]$$

In the above formula, k is the serial number of the candidate parallel decision combination (i, j) of the fifth initial logical node N1 and the sixth initial logical node N2, s is a serial number of the candidate parallel decision of the eighth initial logical node N7, n is a number of the candidate parallel decisions of the sixth initial logical node N2, and k/n is a quotient of k divided by n.

The transmission cost of the connection edge L28 between the initial logical node N8 serving as the eighth initial logical node and the sixth initial logical node N2 is not changed. For the candidate parallel decision combination (i, j) of the fifth initial logical node N1 and the sixth initial logical node N2, the candidate transmission cost of the connection edge L28 of the eighth initial logical node N8 with the candidate parallel decision serial number being s can be taken as a fourth candidate transmission cost which can be expressed as follows:

$$\text{Cost}_{Lms}[k][s] = \text{Cost}_{L28}[k \% n][s]$$

In the above formula, k is a serial number of the candidate parallel decision combination (i, j) of the fifth initial logical node N1 and the sixth initial logical node N2, s is a serial number of the candidate parallel decision of the eighth initial logical node N8, n is a number of the candidate parallel decisions of the sixth initial logical node N2, and k % n is a remainder of k divided by n.

Subsequently, the predetermined configuration transformation assembly 122 combines the fifth initial logical node N1 and the sixth initial logical node N2 of the fourth predetermined configuration F4 into a first combined logical node N$_1^2$ and combines a fifth connection edge (e.g. L14) and a sixth connection edge (e.g. L24) into a third combined connection edge (e.g. Lm4), and assigns the fourth cost sum obtained for the fourth predetermined configuration to the first combined logical node N$_1^2$ as one of its candidate computation costs, and assigns the third candidate transmission cost to the third combined connection edge as one of its candidate transmission costs. Further, the fourth candidate transmission cost is assigned to the connection edge L17 (or Lm7) or the connection edge L28 (or Lm8) only connected with the fifth initial logical node N1 and the sixth initial logical node N2 as one of its candidate transmission costs.

The transformed logical nodes or the candidate computation costs or transmission costs of the connection edges are not illustrated in the braces on the right side of FIG. 5, but they all actually exist. Generally, the predetermined configuration traversal sequence is: the first predetermined configuration F1, the second predetermined configuration F2, and the third predetermined configuration F3. Optionally, the first three predetermined configurations may also be traversed without sequence. When the first three predetermined configurations cannot be traversed, the fourth predetermined configuration F4 may be traversed. In one word, when the first three predetermined configurations cannot be traversed, and there are two or more nodes in a connected component in the transformed topology, namely, the degree of each logical node in the connected component is greater than or equal to 3, the fourth predetermined configuration F4 is traversed to help simplify the topology.

Figure 6:
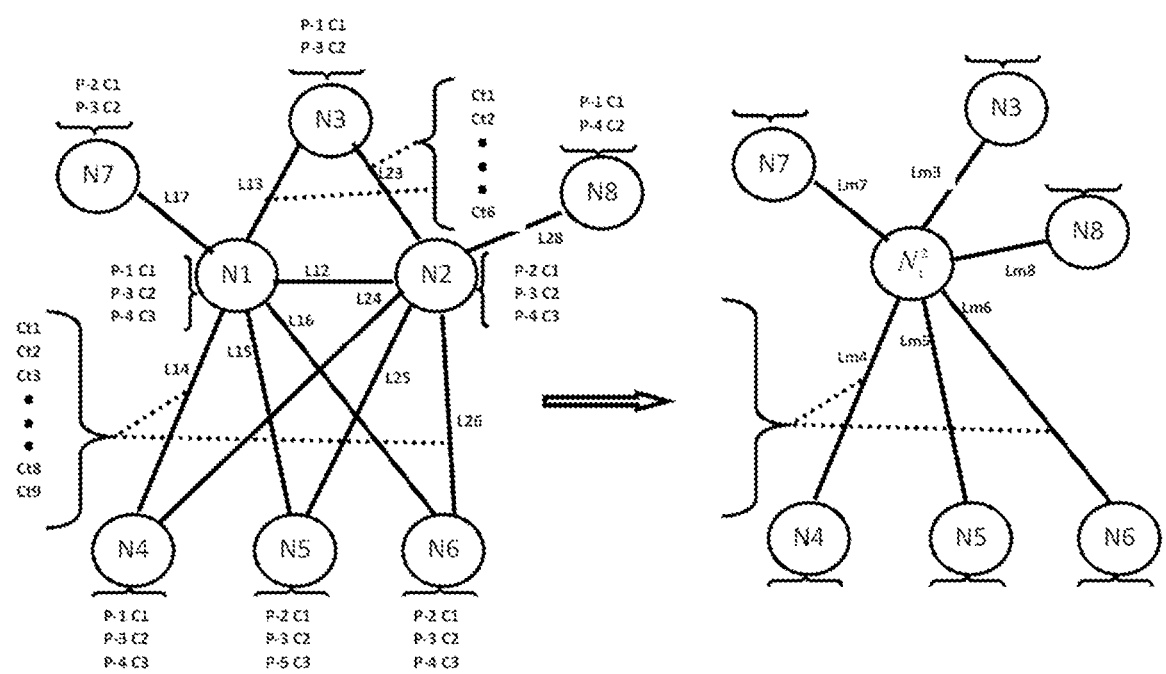
FIG. 6 is a schematic diagram illustrating a fifth predetermined configuration according to the present disclosure.
Figure 7:
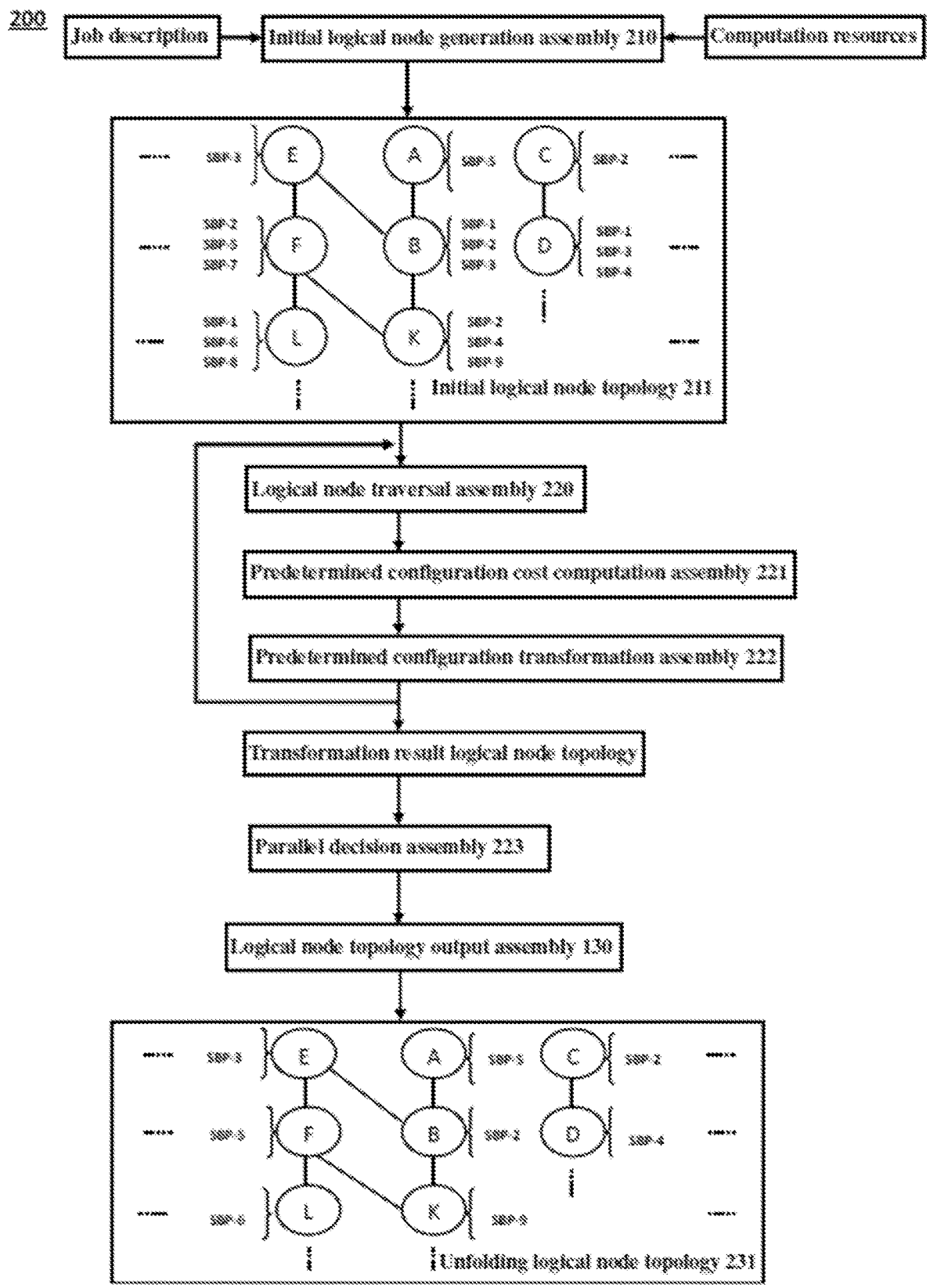
FIG. 7 is a principle schematic diagram illustrating a parallel decision system for distributed data processing according to another embodiment of the present disclosure.

FIG. 6 is a schematic diagram illustrating a fifth predetermined configuration F5 of the present disclosure. As shown in FIG. 6, the fifth predetermined configuration F5 differs from the fourth predetermined configuration F4 only in that there is a seventh connection edge L12 between the fifth initial logical node N1 and the sixth initial logical node N2. The predetermined configuration cost computation assembly 121, in a case of determining the candidate parallel solutions of the fifth initial logical node N1 and the sixth initial logical node N2, obtains the candidate computation costs of the fifth initial logical node N1 and the sixth initial logical node N2 and the transmission cost of the corresponding seventh connection edge and takes a sum of the two candidate computation costs and the transmission cost of the corresponding seventh connection edge as a fifth cost sum.

Specifically, if the fifth initial logical node N1 has m candidate decisions {0, 1, 2, . . . , m−1} and the sixth initial logical node N2 has n candidate decisions {0, 1, 2, . . . , n−1}, in a case of determining any candidate parallel solution combination of the fifth initial logical node N1 and the sixth initial logical node N2, for example, the candidate parallel decision combination of both being (i, j), the corresponding combination serial number is k, where k=i*n+j. At this time, the candidate computation cost of the fifth initial logical node N1 is $Cost_{N1}[i]$ and the candidate computation cost of the sixth initial logical node N2 is $Cost_{N2}[j]$, and the transmission cost of the seventh connection edge L12 is $Cost_{L12}[i][j]$. A sum of the computation cost of the parallel decision combination of both and the transmission cost of the seventh connection edge is denoted as $Cost\ N_1^2[k]$.

$$Cost\ N_1^2[k]=Cost_{N1}[k/n]+Cost_{N2}[k\ \%\ n]+Cost_{L12}[k/n][k\ \%\ n]$$

In the above formula, k/n refers to a quotient of k divided by n, and k % n refers to a remainder of k divided by n. The predetermined configuration cost computation assembly 121 takes a sum of the two candidate transmission costs of the fifth initial logical node N1 and the sixth initial logical node N2 and the transmission cost of the seventh connection edge as the fifth cost sum. Other processings are the same as those for the fourth predetermined configuration and will not be repeated herein.

As mentioned above, an entire computation graph or some computation sub-graphs thereof are given, the candidate parallel decision of each logical node is given, the computation costs of each logical node under different parallel decisions, and the transmission costs of each connection edge under different parallel decisions are calculated, and the computation resources are given (for example, a number of computation cards or computing devices). If each segment of programs in the computation sub-graph is run on various cards or various devices at the same time, the time for running the entire computation sub-graph is about equal to a time required for each card to run all programs. Based on equal sharing of cost, when all logical nodes determine one parallel decision, the computation costs of the cards and the inter-card transmission costs are the same. Thus, one final parallel decision is selected, which determines what parallel decision each logical node is to select and minimizes the total cost of each card as possible.

As mentioned above, after performing any transformation, the predetermined configuration transformation assembly 122 may arrange the logical nodes obtained by transformation as initial logical nodes at the end of the traversed initial logical node queue. After the logical node traversal assembly 120 performs two traversals on all the initial logical nodes, if no predetermined configuration is found, the traversal and transformation operation will be ended and a transformation result logical node topology is output.

By transforming the above four predetermined configurations, the candidate selection space of the parallel decisions is greatly reduced and the topological structure of the computation graph is surely reduced. Hence, there is a limited number of times that a parallel decision is finally performed. If M is a maximum value between a maximum value of the number of the candidate decisions of the initial logical node (the number of the candidate parallel decisions of each initial logical node may be different) and a threshold O, the results shown in the Table below can be obtained respectively after the four predetermined configurations are transformed.

| Predetermined configurations | Reduction of solution space | Reduction of the nodes | Reduction of connection edges | Decision complexity |
|---|---|---|---|---|
| F1 | Yes | One | One | $O(M^3)$ |
| F2 | Yes | One | One | $O(M^2)$ |

-continued

| Predetermined configurations | Reduction of solution space | Reduction of the nodes | Reduction of connection edges | Decision complexity |
|---|---|---|---|---|
| F3 | No | 0 | K edges, k ≥ 1 | $O(kM^2)$ |
| F4 | No | One | K edges, k ≥ 1 | $O((k+1)M^2)$ |

Item 1 in the above Table refers to a sum of degrees of two initial logical nodes N1 and N2 of the fourth predetermined configuration F4.

Next, the parallel decision assembly 123 is configured to, for a transformation result logical node topology and each sub-topology, traverse each final logical node or each final connection edge therein; by a local greedy strategy, obtain a minimum cost sum of the transformation result logical node topology or each sub-topology; and based on an obtained total minimum cost of the transformation result logical node topology, obtain a parallel solution corresponding to the transformation result logical node topology.

When the transformation result logical node topology cannot be further reduced, a final solution is obtained based on the local greedy strategy. The local greedy strategy means a logical node subset of one computation graph is selected each time and then all candidate decision groups are traversed and then one decision group for minimizing the total cost of the computation graph is selected. Multiple operations are performed for different logical node subsets to gradually reduce the total cost. A dot local greedy strategy may be selected, that is, the entire computation graph is cyclically traversed till a number of times n, or cost is no longer reduced after a particular traversal of the computation graph, where n refers to a number of logical nodes of the transformation result logical node topology. Specifically, a dot neighborhood cost refers to, for one logical node under one candidate decision, a sum of the cost of the node and the costs of its all edges. Next, a dot greedy operation is performed, which means traversing all candidate decisions of one logical node and selecting a candidate decision for minimizing the dot neighborhood cost. Finally, the dot local greedy strategy is performed, which means traversing all nodes in one computation graph and performing a dot greedy operation for each node. Optionally, an edge local greedy strategy may be used. The edge local greedy strategy means cyclically traversing the entire computation graph till a number of times n or the cost is no longer reduced after a particular traversal of the computation graph, where n refers to a number of logical nodes in the current computation graph. Firstly, an edge neighborhood cost is determined as follows: for one edge under one candidate decision group of two end points of the edge, a sum of the dot neighborhood costs of the two end points minus the edge cost. This is because the current edge is computed twice when the dot neighborhood costs of the two end points are computed, whereas each topology structure is only computed once. Next, the greedy operation is performed: all candidate decision groups of two end points of one edge are traversed and a candidate decision group for minimizing the edge neighborhood cost of the edge is selected. Finally, the edge local greedy strategy is performed: all edges of one computation graph are traversed and an edge greedy operation is performed for each edge.

The complexity of performing one greedy operation on the logical node subset of one computation graph is $O(eM^p)$, where p is the number of logical nodes in the subset, and e is the number of connection edges included in the direct neighborhood of the logical node subset. At the time of dot greedy operation, e≤n; and at the time of edge greedy operation, e≤2n.

| Decision method | Complexity | Optimization rate |
|---|---|---|
| dot local greedy decision | $O(n^3M)$ | 92.33% |
| edge local greedy decision | $O(n^3M^2 + n^4M)$ | 98.28% |

The optimization rate=(original cost−cost after algorithm application)/(original cost−minimum reachable cost). The optimization rate is an average result of testing 10 randomly-generated computation graphs. The test data is as follows:

| Original cost | Cost after dot local greedy strategy | Cost after edge local greedy strategy | Minimum cost | Optimization rate of dot local greedy strategy | Optimization rate of edge local greedy strategy |
|---|---|---|---|---|---|
| 22165 | 15987 | 14960 | 14739 | 0.831941826 | 0.970239698 |
| 33488 | 23682 | 23223 | 23223 | 0.955284949 | 1 |
| 16992 | 12505 | 11936 | 11346 | 0.794721927 | 0.89550124 |
| 17590 | 10076 | 10076 | 10076 | 1 | 1 |
| 321356 | 243826 | 241578 | 241165 | 0.966816725 | 0.994849796 |
| 144566 | 110476 | 107169 | 106999 | 0.907445364 | 0.995474752 |
| 240787 | 168584 | 164835 | 164313 | 0.944150953 | 0.993174151 |
| 309300 | 233991 | 229658 | 229606 | 0.944977037 | 0.999347504 |
| 316758 | 224522 | 219288 | 217988 | 0.93384631 | 0.986838109 |
| 220035 | 162764 | 160433 | 159965 | 0.953404362 | 0.992209089 |
|  |  |  |  | 0.923258945 | 0.982763434 |

After the first predetermined configuration F1 and the second predetermined configuration F2 are transformed, the candidate selection space is reduced. Since at least one edge is eliminated once, the decision complexity is $O(EM^3)$ and E is the maximum value of the edge of the initial computation graph.

As shown in the above Table, it is a part of the local greedy decision. Since the optimization rate of the edge local greedy decision is higher, the edge local greedy decision can be used as possible. For a connected component with only one logical node, a dot local greedy decision is used (for the connected component has no edge), and for a connected component with multiple logical nodes, the edge local greedy decision is used preferentially.

The local greedy strategy can act on any one computation graph to obtain a conventional algorithm of a suboptimal solution, which will not be repeated herein. If the number of the logical nodes of each connected component of the final transformation result logical node topology is not greater than 3, the local greedy strategy will generate an optimal solution.

Relatively, the complexity of the global algorithm is $O(EM^3+n^3M^2+n^4M)$, where n refers to the number of the logical nodes of the reduced computation graph rather than the number of the logical nodes of the initial computation graph.

Optionally, For the given entire computation graph and some computation sub-graphs, the candidate parallel decisions of each logical node are given, the computation cost of each logical node under different parallel decisions, and the transmission cost of each connection edge under different parallel decisions of end points are computed, and the computation resources are given (e.g. the number of the computation cards or computing devices). At this time, the cost can be considered as a vector, each element of which represents its cost on each computation card. If each logical node in the computation sub-graph is run separately on one computation card, the computation card will run a next logical node after running the logical node. The time required to run the entire computation sub-graph is a time required by all computation cards to run the programs, i.e. the maximum value of the cost vector. A final parallel decision is made by obtaining a minimized maximum value, and the parallel decision determines which computation card each logical node is to be run on, and the maximum value of the total cost of the all computation cards is minimized.

FIG. 6 is a principle diagram of a parallel decision system 200 for distributed data processing according to the present disclosure. It differs from the system 100 in FIG. 1 in that a special parallel decision signature system, i.e. an SBP signature system, is used, For the initial logical nodes A, E, and C which are configured with SBP signature by a user, they only have a unique SBP signature, for example, the initial logical node A has SBP-5, the initial logical node C has SBP-2, and the initial logical node E has SBP-3. When the unique SBP signature is not determined, the initial logical node usually has some inherent candidate SPB signatures. As shown in FIG. 6, the initial logical node B has multiple candidate SBP signatures, for example, three SBP signatures, SBP-1, SBP-2, and SBP-3. Other initial logical nodes also have respective different candidate SBP signatures which are not listed one by one. According to different operations to be executed, different initial logical nodes may have different fixed candidate SBP signatures.

The SBP signature is a signature applied to a distributed data processing system. In the distributed data processing system, because circumstances such as data parallel, model parallel, hybrid parallel and streaming parallel, etc. are often present, the tasks of the neighboring logical nodes are usually deployed to different computing devices at the same time. In a practical data processing process, various computing devices may exchange intermediate parameters, resulting in a huge amount of transmission overhead. Therefore, in order to reduce the data transmission overhead, it is required to generate more logical nodes based on the initial logical node topology 211, so as to perfect the logical node topology. Especially, in order to reduce the transmission overhead between upstream and downstream logical nodes, the change brought by the data distribution manner of the upstream and downstream logical nodes is minimized. In the present disclosure, in order to obtain good downstream logical nodes, a logical distributed signature is specified for each logical node. The logical distributed signature refers to a signature for the logical node by using a tensor distributed descriptor, where each tensor distributed descriptor describes a distribution manner of each tensor in the entire computing system. The tensor distributed descriptors mainly include a split tensor descriptor, a broadcast tensor descriptor, and a partial value tensor descriptor.

Specifically, the split tensor descriptor is used to describe a split manner of a tensor. For example, one data block is split in a specified dimension based on descriptions of a user, and distributed to different computing devices for specified computation processing. If one data block is a two-dimensional data block, when the data block is split in the 0-th dimension, the distributed descriptor of the data tensor of one set of data generated by the data block is S(0) and the distributed descriptors of the data tensor obtained at an input end of each logical data block all are S(0). Similarly, if one data block is a two-dimensional data block, when the data block is split in the first dimension, the distributed descriptor of the data tensor of one set of data generated by the data block is S(1) and the distributed descriptors of the data tensor obtained at an input end of each logical data block all are S(1). Similarly, if the task data to be processed has more dimensions, there will be more distributed descriptors, such as S(2), S(3) . . . and so on. Such data mentioned herein may be processed data or models. If the data itself is split, data parallel processing is formed on the distributed data processing system; if the model is split, model parallel processing is formed on the distributed data processing system. The input of the logical node is such a split tensor descriptor, when the size of one tensor of data is T in a practical data processing process and the tensor is distributed to four computation cards for data parallel computation, the amount of data allocated to each card is a quarter of the data, where the data of the four cards is T.

The broadcast tensor descriptor is used to describe a manner in which one tensor is published in a broadcast in the distributed system. Generally, for the data processing system for only performing data parallel, the model data is usually broadcast to each computing device. The broadcast data input to the logical node is described using a broadcast tensor descriptor. In a practical data processing process, the broadcast data has the same size of data block on each actual computation card.

The partial value tensor descriptor represents an input or output tensor of one logical node and is a partial value of multiple tensors of the same category. These partial values include partial sum (Ps), partial product (Pm), partial "and" result, partial maximum, and partial minimum. Usually, in order to perform data parallel processing the data, the data processing on different devices is processing on partial data. For example, some tensors are S(0) or S(1), and the result tensor obtained in some computing devices is S(0), and the result tensors of these partial computing devices are combined to form the partial value tensor. The data of same category on all devices are combined to produce a final output result.

The distributed descriptors of the above tensors represent the distribution manners of these tensors in the distributed computation system. For these tensors, which are inputs or outputs of the logical nodes, their respective distribution manners also describe the distribution descriptions of the logical nodes for the operation data. For ease of description, the distributed descriptors in the present disclosure are referred to as "SBP descriptors".

Along with the generation of the initial logical node topology 211, the initial logical nodes, i.e. some operation nodes, also have respective input and output data distributed descriptors. These input and output distributed descriptors form a signature for the logical node, namely, a signature for the operation logical node by using a tensor distributed descriptor. For ease of description, the initials of the three distributed descriptors are used to refer to this signature as "SBP signature".

According to the descriptions for the computation task and the requirements for the data parallel by a user in each distributed computation system, these descriptors include at least three categories of descriptors S(0), B, and P. If there are several split manners for the data and the model, one descriptor is added for the addition of each split manner. For each logical node, its signature includes various combinations of these descriptors. In the distributed system of the present disclosure, there are at least three categories of distributed descriptors, and usually four categories of distributed descriptors, for example, the following four SBP descriptors, S(0), S(1), P, and B. According to different numbers of tensor dimensions, there may be more distributed descriptors. If there are four SBP descriptors, multiple SBP descriptors can be formed based on permutation and a combination of input and output. The following are some instances of SPB signatures: (S(0), B)→S(0), (S(1), B)→S(1), P→P, B→B, (S(0), S(1))→P, S(0)→P, S(0)→S(0), S(0)→S(1), P→B and so on. All SBP signatures are the combined results of various SBP signatures. For a matrix multiplication logical node, if its input tensor is split in the first dimension and its output result tensor is also split in the first dimension. In conclusion, S, B, and P are descriptors used to describe the distribution of the data block in the data processing system, and the SBP signature describes the task operation of the logical node by using multiple SBP descriptors. Each data block may have multiple categories of SBP descriptors and the operation mode represented by each logical node may involve multiple categories of SBP signatures. For example, the SBP-1 shown in FIG. 6 may be in the form of (S(0), B)→S(0), and the SBP-2 may be in the form of (S(1), B)→S(1). In practical applications, different signature forms have different serial numbers. These serial numbers are used only for ease of description and do not mean one serial number is to be assigned to each signature, namely, there may be no serial number. Different forms of signatures may be distinguished without serial numbers.

Based on the task descriptions, the above SBP signature is assigned to each initial logical node. Usually, the task logical nodes are some operation nodes that execute specified operations. Therefore, they have specific candidate SBP signatures. It should be pointed out that each task logical node has the same SBP signature. Generally, the input tensor of the SBP signature of the task logical nodes for performing multiplication operations does not include a partial sum tensor, and the SBP descriptor of its input tensor does not include the distributed descriptor P. The candidate SBP signatures of the task logical nodes for performing addition operations may include any combination of various categories of SBP descriptors between the categories or within one category. For example, for the task logical nodes for performing matrix multiplication, in a case of only data parallel, their candidate SBP signatures usually are (S(0), B)→S(0), (S(1), B)→S(1), (S(0), S(1))→P and the like. Furthermore, along with technological development, some signatures which are not applicable to matrix multiplication previously may be applied to matrix multiplication, which is only exemplified herein. Each initial logical node is attached with a candidate logical distributed signature set based on the task configuration data. Each logical distributed signature in the candidate logical distributed signature set specifies a distributed descriptor of each input tensor and the distributed descriptor of each output tensor of the initial logical node to which the signature belongs.

Although a traditional method of determining the final SBP signature in some candidate SBP signatures is given above, in some specific circumstances, for some logical nodes for which a special configuration is made by a user or there is user specification, these logical nodes only have user-specified SBP signatures. Therefore, the downstream logical nodes may determine the SBP signature based on the specially-specified upstream logical node. Therefore, the SBP signature shown in FIG. 6 may be used to replace the parallel strategy signature P shown in FIG. 1. Other parts are the same as the descriptions of FIG. 1 and will not be repeated herein.

In the parallel decision system and method for distributed data processing according to the present disclosure, a solution space faced by the parallel decision of distributed data processing is reduced as possible from a global angle, so as to increase the feasibility of performing automatic parallel decision and reduce the difficulty of the automatic parallel decision. Further, the parallel result obtained by the parallel decision has low computation cost and transmission cost, so as to increase, as possible, the computation efficiency of the same computation task based on fixed computation resources, and thus speed up data processing. More importantly, the automatic parallel decision is implemented while the lowest transmission cost is approximated as possible, thereby greatly reducing the costs of manual debugging.

The basic principle of the present disclosure is described using specific embodiments as above. It should be noted that those skilled in the arts can understand that all or part of the steps or components of the method or apparatus of the present disclosure can be implemented in the form of hardware, firmware, software, or their combinations in the network of any computing apparatus (including a processor and storage medium and the like) or computing apparatus and the implementation can be achieved by those skilled in the art by employing their basic programming skills after reading the descriptions of the present disclosure.

Further, the object of the present disclosure may also be implemented by running one program or one set of programs on any computing apparatus. The computing apparatus may be a well-known general apparatus. The object of the present disclosure may also be implemented by only providing a program product containing program codes for implementing the method or apparatus. Namely, such a program product and the storage medium storing the program product also constitute the present disclosure. Apparently, the storage medium may be any well-known storage medium or any storage medium to be developed in the future.

It is to be noted that, in the apparatus and method of the present disclosure the components and steps may be decomposed and/or recombined. These decompositions and/or recombinations shall be considered equivalent solutions to the present disclosure. Furthermore, the steps for performing the above processing are naturally performed in a time sequence as described therein but are not necessarily performed in the time sequence. Some steps may be performed in parallel or independently.

The above specific embodiments do not constitute a limitation to the scope of protection of the present disclosure. Those skilled in the art should understand that depending on the design requirements and other factors, various changes, combinations, sub-combinations, and replacements may be made. All changes, equivalent substitutions, and improvements made within the spirit and principle of the present disclosure shall all fall within the scope of protection of the present disclosure.

What is claimed is:

1. A parallel decision system for distributed data processing, comprising:
an initial logical node generation assembly, configured to receive task configuration data input by a user to generate an initial logical node topology for the distributed data processing system, wherein each initial logical node is attached with a candidate parallel solution set based on the task configuration data, each candidate parallel solution specifies a initial logical node parallel solution to which the candidate parallel solution belongs and a candidate computation cost label based on the parallel solution, each connection edge between mutually-connected initial logical nodes is attached with a candidate transmission cost label, and the candidate transmission cost is determined by the respective parallel solutions of mutually-connected initial logical nodes;
a logical node traversal assembly, configured to traverse the initial logical node topology to obtain a predetermined configuration in the initial logical node topology, wherein the predetermined configuration comprises a first predetermined configuration and/or a second predetermined configuration, the first predetermined configuration is an intermediate initial logical node with a first connection edge and a second connection edge, and the second predetermined configuration is paired initial logical nodes with multiple third connection edges therebetween;
a predetermined configuration cost computation assembly, configured to, for the first determined configuration, in a case of determining a candidate parallel solution of a first initial logical node of the first connection edge and a candidate parallel solution of a second initial logical node of the second connection edge, obtain each candidate computation cost of the intermediate initial logical node, a first connection edge candidate transmission cost and a second connection edge candidate transmission cost corresponding to the obtained candidate computation cost and a first cost sum of the above three in a case of obtaining each candidate computation cost of each intermediate initial logical node, select a minimum first cost sum as a first candidate transmission cost between the first initial logical node and the second initial logical node in the first predetermined configuration in a case of determining the candidate parallel solution of the first initial logical node of each pair and the candidate parallel solution of the second initial logical node;
for the second predetermined configuration, in a case of determining the candidate parallel solution of a third initial logical node of the paired initial logical nodes and the candidate parallel solution of a fourth initial logical node of the paired initial logical nodes, perform summing for the candidate transmission costs of all connection edges between the paired initial logical nodes to obtain a second cost sum of the candidate transmission costs between the paired initial logical nodes as a second candidate transmission cost;
a predetermined configuration transformation assembly, configured to transform the first connection edge, the second connection edge and the intermediate initial logical node of the first predetermined configuration into a first combined connection edge between the first initial logical node of the first connection edge and the second initial logical node of the second connection edge, and assign all first candidate transmission costs obtained for the first predetermined configuration to the first combined connection edge as one of the candidate transmission costs of the first combined connection edge, and transform all connection edges of the second predetermined configuration into a second combined connection edge of the paired initial logical nodes, and assign the second candidate transmission cost obtained for the second predetermined configuration to the second combined connection edge of the paired initial logical nodes as one of the candidate transmission costs of the second combined connection edge;

a parallel decision assembly, configured to, for a transformation result logical node topology and each sub-topology obtained by performing transformation by using the predetermined configuration transformation assembly, repeatedly traverse each final logical node or each final connection edge therein many times;

by a local greedy strategy, obtain a minimum cost sum of the transformation result logical node topology or each sub-topology; and based on an obtained total minimum cost of the transformation result logical node topology, obtain a parallel solution corresponding to the transformation result logical node topology.

2. The parallel decision system of claim 1, wherein the predetermined configuration further comprises a third predetermined configuration, which is an end initial logical node with only a fourth connection edge, wherein the predetermined configuration cost computation assembly is configured to, for the third predetermined configuration, in a case of determining a candidate parallel solution of a dependent initial logical node to which the fourth connection edge of the third predetermined configuration is attached at the end initial logical node, obtain each candidate computation cost of the end initial logical node and a fourth connection edge candidate transmission cost corresponding to the candidate computation cost of the end initial logical node; obtain a third cost sum of the above two in a case of determining the candidate parallel solution of the dependent initial logical node;

select a minimum third cost sum as a third additional computation cost in a case of determining the candidate parallel solution of the dependent initial logical node; and the predetermined configuration transformation assembly clips off the fourth connection edge and the end initial logical node of the third predetermined configuration and adds the third additional computation cost to the computation cost of the dependent initial logical node.

3. The parallel decision system of claim 1, wherein the predetermined configuration further comprises a fourth predetermined configuration, which comprises a fifth initial logical node and a sixth initial logical node which have no connection edge therebetween in a same connected component with a product of candidate parallel decision numbers not exceeding a given threshold, and at least one seventh initial logical node connected to the fifth initial logical node and the sixth initial logical node, wherein the predetermined configuration cost computation assembly is configured to, for the fourth predetermined configuration, in a case of determining the candidate parallel solutions of the fifth initial logical node and the sixth initial logical node, obtain the candidate computation costs of the fifth initial logical node and the sixth initial logical node and take a sum of the two candidate computation costs as a fourth cost sum;

in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; and the predetermined configuration transformation assembly is configured to combine the fifth initial logical node and the sixth initial logical node of the fourth predetermined configuration into a first combined logical node, and combine the fifth connection edge and the sixth connection edge into a third combined connection edge, and assign the fourth cost sum obtained for the fourth predetermined configuration to the first combined logical node as one of the candidate computation costs and assign the third candidate transmission cost to the third combined connection edge as one of the candidate transmission costs.

4. The parallel decision system of claim 1, wherein the predetermined configuration further comprises a fifth predetermined configuration, which comprises a fifth initial logical node and a sixth initial logical node which have a seventh connection edge therebetween in a same connected component with a product of candidate parallel decision numbers not exceeding a given threshold, and at least one seventh initial logical node connected to the fifth initial logical node and the sixth initial logical node, wherein the predetermined configuration cost computation assembly is configured to, for the fifth predetermined configuration, in a case of determining the candidate parallel solutions of the fifth initial logical node and the sixth initial logical node, obtain the candidate computation costs of the fifth initial logical node and the sixth initial logical node and a transmission cost of the connection edge therebetween and take a sum of the two candidate computation costs and the transmission cost corresponding to the seventh connection edge as a fifth cost sum;

in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; and the predetermined configuration transformation assembly is configured to combine the fifth initial logical node and the sixth initial logical node of the fifth predetermined configuration into a second combined logical node, and combine the fifth connection edge and the sixth connection edge into a third combined connection edge, and assign the fifth cost sum obtained for the fifth predetermined configuration to the second combined logical node as one of the candidate computation costs and assign the third candidate transmission cost to the third combined connection edge as one of the candidate transmission costs.

5. A parallel decision method for distributed data processing, comprising:
- an initial logical node generation step of: receiving task configuration data input by a user to generate an initial logical node topology for the distributed data processing system, wherein each initial logical node is attached with a candidate parallel solution set based on the task configuration data, each candidate parallel solution specifies a initial logical node parallel solution to which the candidate parallel solution belongs and a candidate computation cost label based on the parallel solution, each connection edge between mutually-connected initial logical nodes is attached with a candidate transmission cost label, and the candidate transmission cost is determined by the respective parallel solutions of mutually-connected initial logical nodes;
- a logical node traversal step of: traversing the initial logical node topology to obtain a predetermined configuration in the initial logical node topology, wherein the predetermined configuration comprises a first predetermined configuration and/or a second predetermined configuration, the first predetermined configuration is an intermediate initial logical node with a first connection edge and a second connection edge, and the second predetermined configuration is paired initial logical nodes with multiple third connection edges therebetween;
- a predetermined configuration cost computation step of:
  for the first determined configuration, in a case of determining a candidate parallel solution of a first initial logical node of the first connection edge and a candidate parallel solution of a second initial logical node of the second connection edge, obtaining each candidate computation cost of the intermediate initial logical node, a first connection edge candidate transmission cost and a second connection edge candidate transmission cost corresponding to the obtained candidate computation cost and a first cost sum of the above three in a case of obtaining each candidate computation cost of each intermediate initial logical node, selecting a minimum first cost sum as a first candidate transmission cost between the first initial logical node and the second initial logical node in the first predetermined configuration in a case of determining the candidate parallel solution of the first initial logical node of each pair and the candidate parallel solution of the second initial logical node;
  for the second predetermined configuration, in a case of determining the candidate parallel solution of a third initial logical node of the paired initial logical nodes and the candidate parallel solution of a fourth initial logical node of the paired initial logical nodes, performing summing for the candidate transmission costs of all connection edges between the paired initial logical nodes to obtain a second cost sum of the candidate transmission costs between the paired initial logical nodes as a second candidate transmission cost;
- a predetermined configuration transformation step of: transforming the first connection edge, the second connection edge and the intermediate initial logical node of the first predetermined configuration into a first combined connection edge between the first initial logical node of the first connection edge and the second initial logical node of the second connection edge, and assigning all first candidate transmission costs obtained for the first predetermined configuration to the first combined connection edge as one of the candidate transmission costs of the first combined connection edge, and transforming all connection edges of the second predetermined configuration into a second combined connection edge of the paired initial logical nodes, and assigning the second candidate transmission cost obtained for the second predetermined configuration to the second combined connection edge of the paired initial logical nodes as one of the candidate transmission costs of the second combined connection edge;
- a parallel decision step of: for a transformation result logical node topology and each sub-topology obtained by performing transformation by using the predetermined configuration transformation step, repeatedly traversing each final logical node or each final connection edge therein many times;
- by a local greedy strategy, obtaining a minimum cost sum of the transformation result logical node topology or each sub-topology; and
- based on an obtained total minimum cost of the transformation result logical node topology, obtaining a parallel solution corresponding to the transformation result logical node topology.

6. The parallel decision method of claim 5, wherein obtaining the predetermined configuration in the initial logical node topology further comprises obtaining a third predetermined configuration, which is an end initial logical node with only a fourth connection edge, wherein the predetermined configuration cost computation step is used to, for the third predetermined configuration, in a case of determining a candidate parallel solution of a dependent initial logical node to which the fourth connection edge of the third predetermined configuration is attached at the end initial logical node, obtain each candidate computation cost of the end initial logical node and a fourth connection edge candidate transmission cost corresponding to the candidate computation cost of the end initial logical node;
- obtain a third cost sum of the above two in a case of determining the candidate parallel solution of the dependent initial logical node;
- select a minimum third cost sum as a third additional computation cost in a case of determining the candidate parallel solution of the dependent initial logical node; and
- the predetermined configuration transformation step is used to clip off the fourth connection edge and the end initial logical node of the third predetermined configuration and add the third additional computation cost to the computation cost of the dependent initial logical node.

7. The parallel decision method of claim 5, wherein obtaining the predetermined configuration in the initial logical node topology further comprises obtaining a fourth predetermined configuration, which comprises a fifth initial logical node and a sixth initial logical node which have no connection edge therebetween in a same connected component with a product of candidate parallel decision numbers not exceeding a given threshold, and at least one seventh initial logical node connected to the fifth initial logical node and the sixth initial logical node, wherein the predetermined configuration cost computation step is used to, for the fourth predetermined configuration, in a case of determining the candidate parallel solutions of the fifth initial logical node and the sixth initial logical node, obtain the candidate computation costs of the fifth initial logical node and sixth initial logical node and take a sum of the two candidate computation costs as a fourth cost sum;

in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; and the predetermined configuration transformation step is used to combine the fifth initial logical node and the sixth initial logical node of the fourth predetermined configuration into a first combined logical node, and combine the fifth connection edge and the sixth connection edge into a third combined connection edge, and assign the fourth cost sum obtained for the fourth predetermined configuration to the first combined logical node as one of the candidate computation costs and assign the third candidate transmission cost to the third combined connection edge as one of the candidate transmission costs.

8. The parallel decision method of claim 5, wherein obtaining the predetermined configuration in the initial logical node topology further comprises obtaining a fifth predetermined configuration, which comprises a fifth initial logical node and a sixth initial logical node which have a seventh connection edge therebetween in a same connected component with a product of candidate parallel decision numbers not exceeding a given threshold, and at least one seventh initial logical node connected to the fifth initial logical node and the sixth initial logical node, wherein the predetermined configuration cost computation step is used to, for the fifth predetermined configuration, in a case of determining the candidate parallel solutions of the fifth initial logical node and the sixth initial logical node, obtain the candidate computation costs of the fifth initial logical node and the sixth initial logical node and a transmission cost of the connection edge therebetween and take a sum of the two candidate computation costs and the transmission cost corresponding to the seventh connection edge as a fifth cost sum;

in a case of determining the candidate parallel solutions of the fifth initial logical node, the sixth initial logical node and the seventh initial logical node, obtain candidate transmission costs of a fifth connection edge and a sixth connection edge between the fifth initial logical node and the seventh initial logical node and between the sixth initial logical node and the seventh initial logical node and take a sum of the two candidate transmission costs as a third candidate transmission cost; and the predetermined configuration transformation step is used to combine the fifth initial logical node and the sixth initial logical node and the seventh connection edge of the fifth predetermined configuration into a second combined logical node, and combine the fifth connection edge and the sixth connection edge into a third combined connection edge, and assign the fifth cost sum obtained for the fifth predetermined configuration to the second combined logical node as one of the candidate computation costs and assign the third candidate transmission cost to the third combined connection edge as one of the candidate transmission costs.

* * * * *